United States Patent
Lim et al.

(10) Patent No.: US 10,123,285 B2
(45) Date of Patent: Nov. 6, 2018

(54) METHOD FOR REDUCING TRANSMISSION POWER AND VEHICLE-TO-EVERYTHING (V2X) COMMUNICATION DEVICE THEREOF

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/730,648

(22) Filed: Oct. 11, 2017

(65) Prior Publication Data

US 2018/0103441 A1    Apr. 12, 2018

Related U.S. Application Data

(60) Provisional application No. 62/407,006, filed on Oct. 12, 2016, provisional application No. 62/417,441, filed on Nov. 4, 2016.

(51) Int. Cl.
*H04W 52/36* (2009.01)
*H04W 40/08* (2009.01)
*H04B 7/0452* (2017.01)
*H04W 52/14* (2009.01)

(52) U.S. Cl.
CPC ........ *H04W 52/367* (2013.01); *H04B 7/0452* (2013.01); *H04W 40/08* (2013.01); *H04W 52/146* (2013.01)

(58) Field of Classification Search
CPC ....... H04W 52/00–52/60; H04W 40/08; H04B 7/0452
See application file for complete search history.

(56) References Cited

U.S. PATENT DOCUMENTS

2017/0188391 A1\* 6/2017 Rajagopal ......... H04W 74/0816
2018/0092073 A1\* 3/2018 Nogami ............. H04W 72/042

\* cited by examiner

*Primary Examiner* — Raymond Dean
(74) *Attorney, Agent, or Firm* — Lee, Hong, Degerman, Kang & Waimey PC

(57) ABSTRACT

There is provided a method for reducing transmission power. The method may be performed by a vehicle-to-everything (V2X) communication device and comprise: deriving a value of maximum power reduction (MPR); determining a transmission power by using the value of the MPR; and transmitting signals at the determined transmission power. If the signals are a physical sidelink control channel (PSCCH) signal and physical sidelink shared channel (PSSCH) signal and if simultaneous transmissions of the PSCCH signal and the PSSCH signal is configured, the value of the the MPR may be equal to or less than 1.5 dB or 2 dB.

10 Claims, 31 Drawing Sheets

A-MPR simulation results for Non-adjacent RB allocation to protect 5795MHz~5815MHz w/ -30dBm/MHz Power backoff simulation results for adjacent RB allocation
to protect 5795MHz~5815MHz w/ -65dBm/MHz

METHOD FOR REDUCING TRANSMISSION POWER AND VEHICLE-TO-EVERYTHING (V2X) COMMUNICATION DEVICE THEREOF

CROSS-REFERENCE TO RELATED APPLICATIONS

Pursuant to 35 U.S.C. § 119(e), this application claims the benefit of U.S. Provisional Patent Application Nos. 62/407,006, filed on Oct. 12, 2016 and 62/417,441, filed on Nov. 4, 2016, the contents of which are all hereby incorporated by reference herein in their entirety.

FIELD OF THE INVENTION

The present invention relates to mobile communication.

RELATED ART

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

In LTE/LTE-A, a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

In recent days, due to user's needs for SNS (Social Network Service), communication between user equipments (UEs) physically close to each other, that is, D2D (Device to Device) communication has been required.

The above-mentioned D2D may also be applied to vehicle-to-everything (V2X). The V2X collectively refers to communication technology through all interfaces with vehicles.

On the other hand, it is expected that the V2X terminal can use a transmission power higher than that of the UE because the V2X terminal has no limitation to a battery unlike a terminal.

However, in order to globally sale a V2X terminal, regulation of each country should be satisfied. Particularly in an EU, there are many regulations for protecting frequencies from interferences of V2X terminal. Accordingly, there is a need for researches and studies for a scheme to satisfy the regulations.

SUMMARY OF THE INVENTION

Accordingly, an object of the present invention is to solve the above-mentioned problems.

To achieve the foregoing purposes, the disclosure of the present invention proposes a method for reducing transmission power. The method may be performed by a vehicle-to-everything (V2X) communication device and comprise: deriving a value of maximum power reduction (MPR); determining a transmission power by using the value of the MPR; and transmitting signals at the determined transmission power. If the signals are a physical sidelink control channel (PSCCH) signal and physical sidelink shared channel (PSSCH) signal and if simultaneous transmissions of the PSCCH signal and the PSSCH signal is configured, the value of the MPR may be equal to or less than 1.5 dB or 2 dB.

If the signals are modulated by a quadrature phase shift keying (QPSK), the value of the MPR may be equal to or less than 1.5 dB.

If the signals are modulated by a 16 quadrature amplitude modulation (QAM), the value of the MPR may be equal to or less than 2 dB.

The using of the value of the MPR may include: subtracting the value of the MPR from a maximum output power.

If a resource blocks (RB) for the PSCCH and a RB for the PSSCCH are allocated in adjacent to each other, the value of the MPR may be used to determine the transmission power.

To achieve the foregoing purposes, the disclosure of the present invention proposes a vehicle-to-everything (V2X) communication device for reducing transmission power. The V2X communication device may comprise: a transceiver; and a processor configured to control the transceiver and perform: deriving a value of maximum power reduction (MPR); determining a transmission power by using the value of the MPR; and transmitting signals at the determined transmission power. If the signals are a physical sidelink control channel (PSCCH) signal and physical sidelink shared channel (PSSCH) signal and if simultaneous transmissions of the PSCCH signal and the PSSCH signal is configured, the value of the MPR may be equal to or less than 1.5 dB or 2 dB.

According to the disclosure of the present invention, the problem of the conventional technology described above may be solved.

DESCRIPTION OF EXEMPLARY EMBODIMENTS

Figure 1:
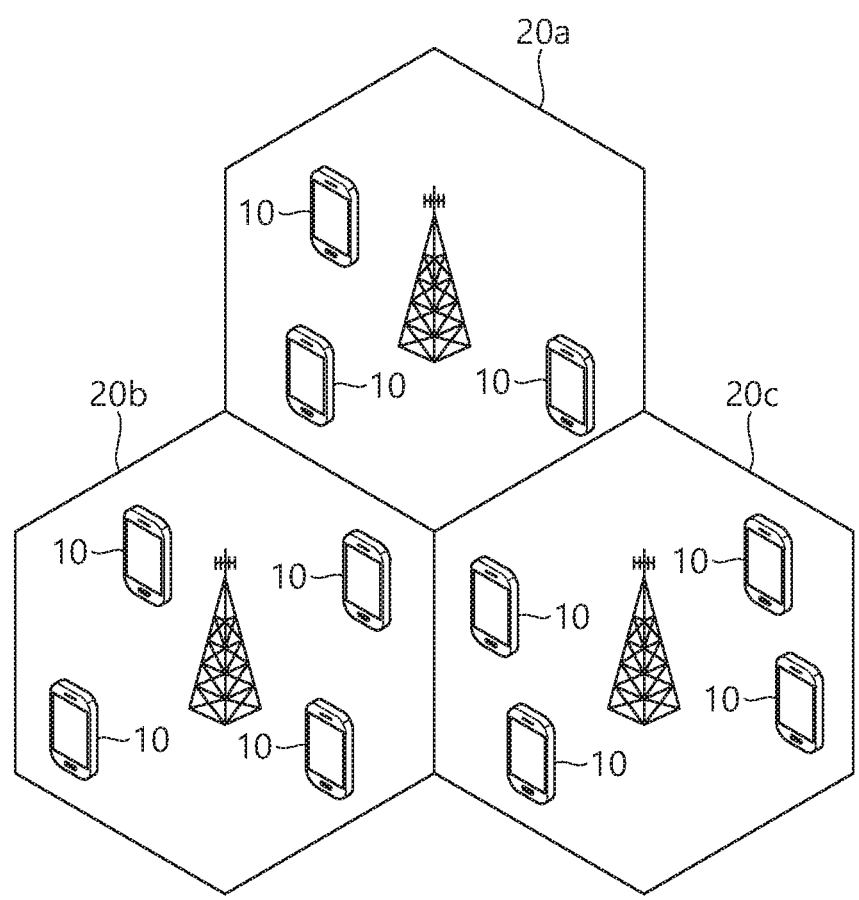
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
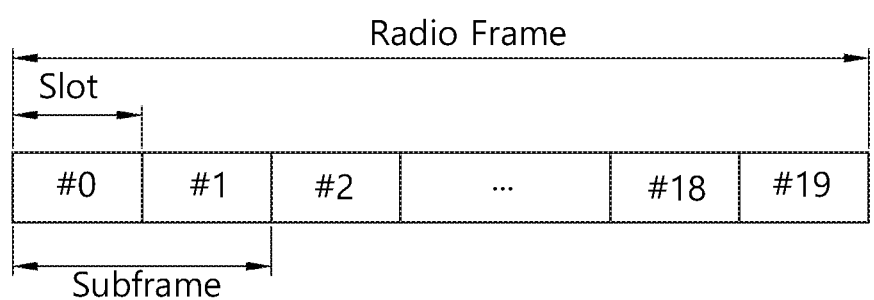
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP.

Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
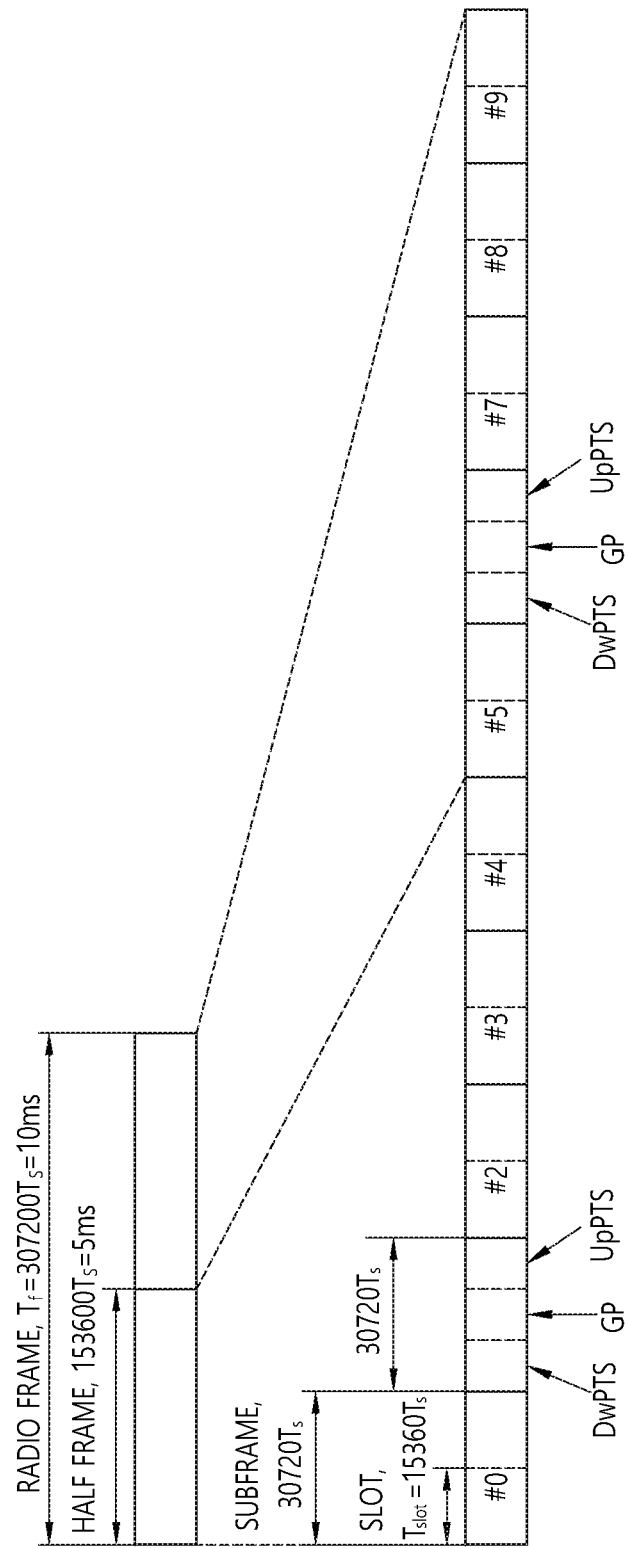
FIG. 3 illustrates a structure of a downlink radio frame according to TDD in the 3GPP LTE.

FIG. 3 illustrates the architecture of a downlink radio frame according to TDD in 3GPP LTE.

Sub-frames having index #1 and index #6 are denoted special sub-frames, and include a DwPTS(Downlink Pilot Time Slot: DwPTS), a GP(Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame.

When receiving a UL-DL configuration from the base station, the terminal may be aware of whether a sub-frame is a DL sub-frame or a UL sub-frame according to the configuration of the radio frame.

TABLE 2

| | Normal CP in downlink | | | Extended CP in downlink | | |
|---|---|---|---|---|---|---|
| | | UpPTS | | | UpPTS | |
| Special subframe configuration | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | | |
| 5 | 6592*Ts | 4384*Ts | 5120*ts | 20480*Ts | 4384*Ts | 5120*ts |
| 6 | 19760*Ts | | | 23040*Ts | | |
| 7 | 21952*Ts | | | — | | |
| 8 | 24144*Ts | | | — | | |

Figure 4:
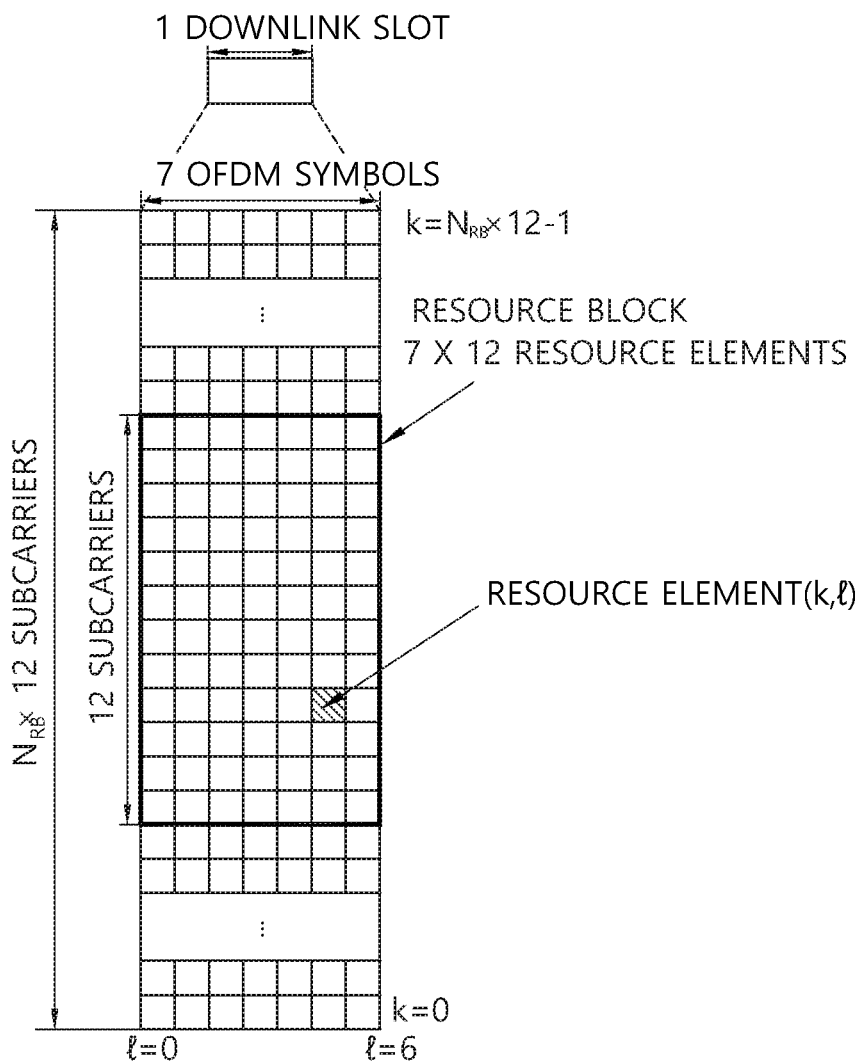
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
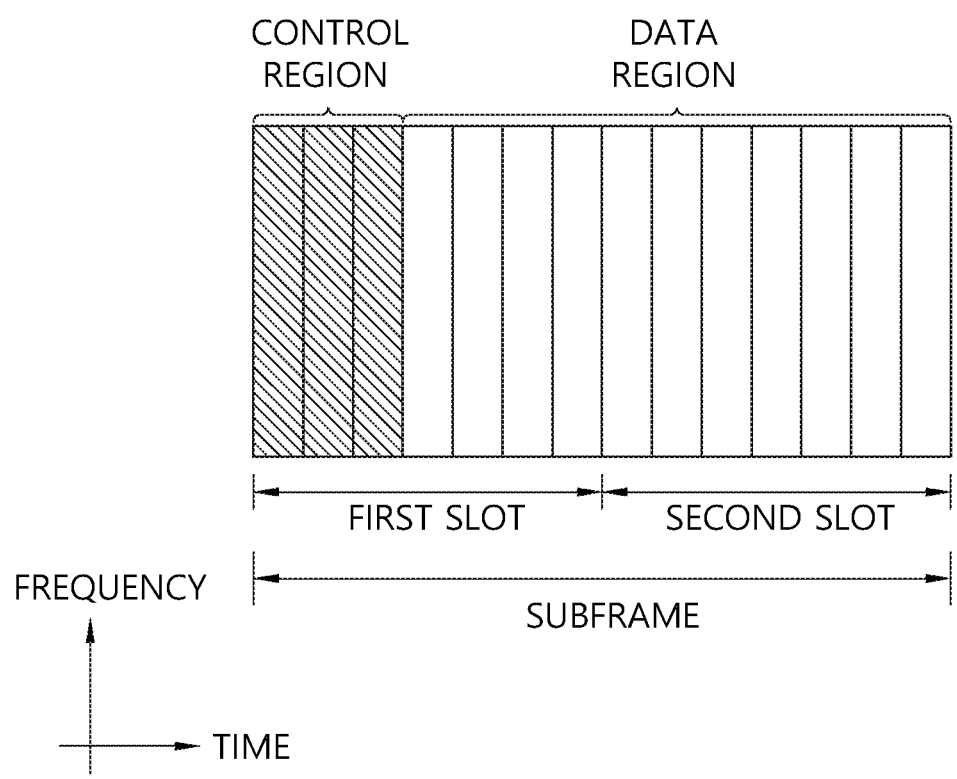
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
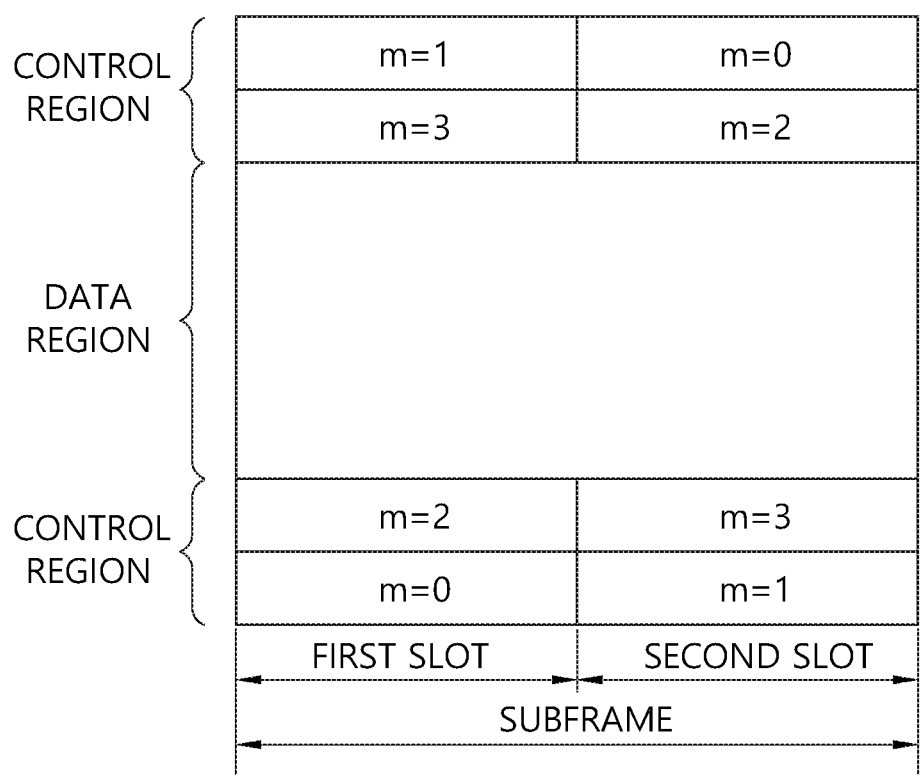
FIG. 6 illustrates the architecture of an uplink subframe in 3GPP LTE.
Figure 6:
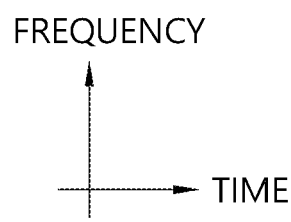

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA)>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 7A:
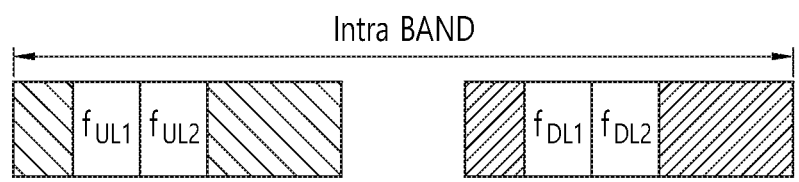
FIG. 7A illustrates intra-band contiguous CA.
Figure 7B:
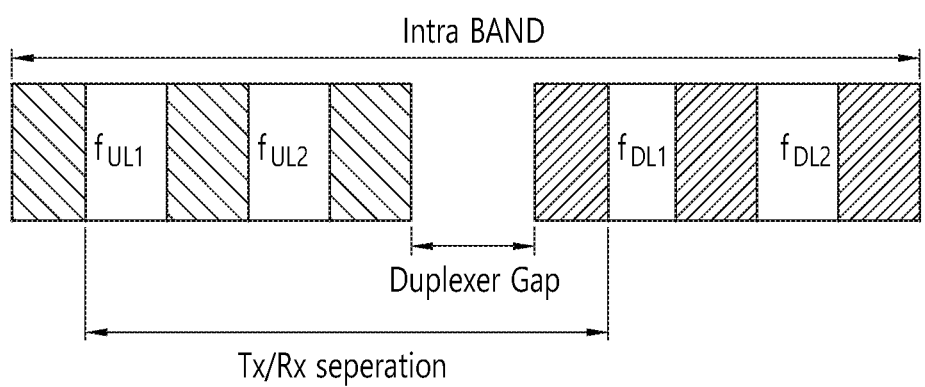
FIG. 7B illustrates intra-band non-contiguous CA.

FIG. 7A illustrates intra-band contiguous CA, and FIG. 7B illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 7A and the intra-band non-contiguous CA shown in FIG. 7B.

Figure 8A:
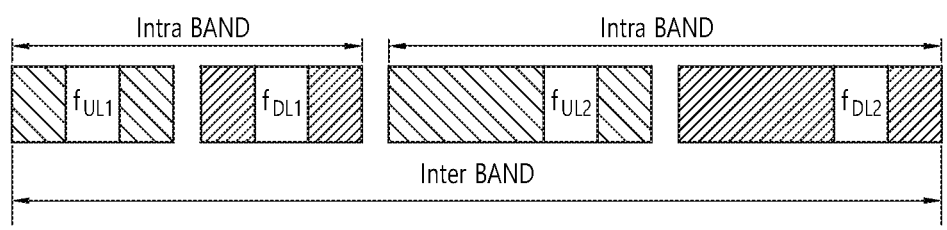
FIG. 8A illustrates a combination of a lower band and a higher band for inter-band CA.
Figure 8B:
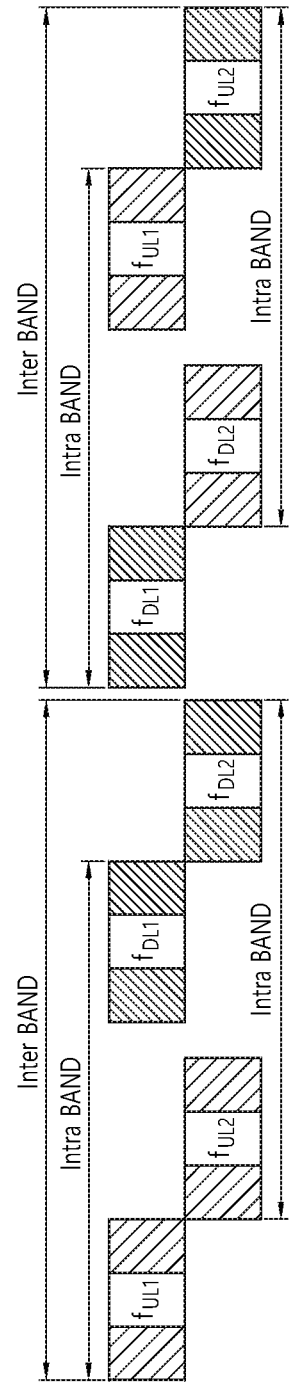
FIG. 8B illustrates a combination of similar frequency bands for inter-band CA.

FIG. 8A illustrates a combination of a lower band and a higher band for inter-band CA, and FIG. 8B illustrates a combination of similar frequency bands for inter-band CA.

In other words, the inter-band carrier aggregation may be separated into inter-band CA between carriers of a low band and a high band having different RF characteristics of inter-band CA as shown in FIG. 8A and inter-band CA of similar frequencies that may use a common RF terminal per component carrier due to similar RF (radio frequency) characteristics as shown in FIG. 8B.

TABLE 3

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD8, 9 |
| 47 | 5855 MHz-5925 MHz | 5855 MHz-5925 MHz | TDD |
| 48 | 3550 MHz-3700 MHz | 3550 MHz-3700 MHz | TDD |
| 64 | Reserved | | |
| 65 | 1920 MHz-2010 MHz | 2110 MHz-2200 MHz | FDD |
| 66 | 1710 MHz-1780 MHz | 2110 MHz-2200 MHz | FDD4 |
| 67 | N/A | 738 MHz-758 MHz | FDD2 |
| 68 | 698 MHz-728 MHz | 753 MHz-783 MHz | FDD |
| 69 | N/A | 2570 MHz-2620 MHz | FDD |
| 70 | 1695 MHz-1710 MHz | 1995 MHz-2020 MHz | FDD10 |

In this case, $F_{UL\_low}$ means the lowest frequency of an UL operating band. Furthermore, $F_{UL\_high}$ means the highest frequency of an UL operating band. Furthermore, $F_{DL\_low}$ means the lowest frequency of a DL operating band. Furthermore, $F_{DL\_high}$ means the highest frequency of a DL operating band.

Figure 9:
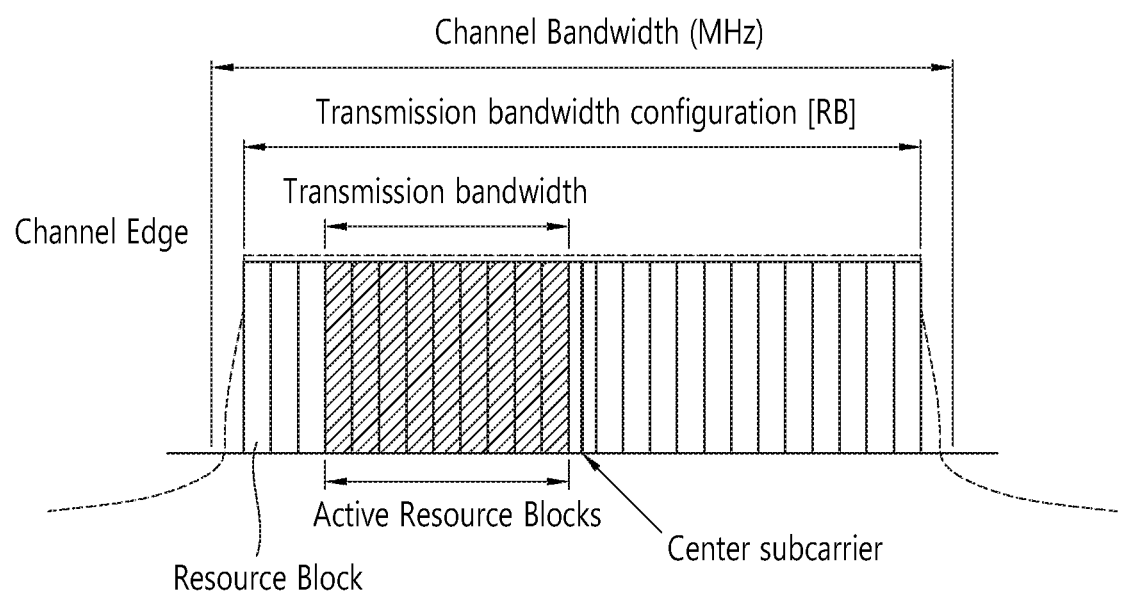
FIG. 9 shows a relation between a channel band MHz and a resource block (RB).

FIG. 9 shows a relation between a channel band MHz and a resource block (RB).

As may be seen with reference to FIG. 9, a transmission bandwidth smaller than a channel bandwidth BWChannel is set. The setting of the transmission bandwidth is performed by a plurality of resource blocks (RBs). Furthermore, the outskirt of a channel is the highest and lowest frequencies separated by the channel bandwidth.

Meanwhile, as described above, a 3GPP LTE system supports channel bandwidths of 1.4 MHz, 3 MHz, 5 MHz, 10 MHz, 15 MHz and 20 MHz. A relation between such a channel bandwidth and a resource block is listed in the following table.

TABLE 4

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Meanwhile, intra-band contiguous CA bandwidth classes and their corresponding guard bands are as shown in the following table.

TABLE 5

| CA Bandwidth Class | Aggregated Transmission Bandwidth Configuration | Maximum number of CCs | Nominal Guard Band $BW_{GB}$ |
|---|---|---|---|
| A | $N_{RB,agg} \leq 100$ | 1 | a1 $BW_{Channel(1)} - 0.5\Delta f1$ (NOTE2) |
| B | $N_{RB,agg} \leq 100$ | 2 | $0.05 \max(BW_{Channel(1)}, BW_{Channel(2)}) - 0.5\Delta f1$ |
| C | $100 < N_{RB,agg} \leq 200$ | 2 | $0.05 \max(BW_{Channel(1)}, BW_{Channel(2)}) - 0.5\Delta f1$ |
| D | $200 < N_{RB,agg} \leq [300]$ | FFS | $0.05 \max(BW_{Channel(1)}, BW_{Channel(2)}) - 0.5\Delta f1$ |
| E | $[300] < N_{RB,agg} \leq [400]$ | FFS | FFS |
| F | $[400] < N_{RB,agg} \leq [500]$ | FFS | FFS |

NOTE1:
$BW_{Channel(j),j} = 1, 2, 3$ is the channel bandwidth of the E-UTRA component carriers defined in TS36.101 table 5.6-1, $\Delta f1$ represents subcarrier spacing of $\Delta f$ when downlink, and $\Delta f1 = 0$ in downlink.
NOTE2:
In case that the channel frequency bandwidth is 1.4 MHz, a1 = 0.16/1.4, and in the remainder frequency band, a1 = 0.05.

In the above table, the brackets [ ] represent that the value therebetween is not completely determined and may be varied. FFS stands for 'For Further Study.' $N_{RB\_agg}$ is the number of RB s aggregated in an aggregation channel band.

Table 6 below shows a set of bandwidths, each corresponding to each CA configuration.

TABLE 6

| | E-UTRA CA configuration/Bandwidth combination set | | | | | |
|---|---|---|---|---|---|---|
| E-UTRA CA configuration | 50 RB + 100 RB (10 MHz + 20 MHz) | 75 RB + 75 RB (15 MHz + 15 MHz) | 75 RB + 100 RB (15 MHz + 20 MHz) | 100 RB + 100 RB (20 MHz + 20 MHz) | Maximum aggregated bandwidth [MHz] | Bandwidth Combination Set |
| CA_1C | | Yes | | Yes | 40 | 0 |
| CA_7C | | Yes | | Yes | 40 | 0 |
| CA_38C | | Yes | | Yes | 40 | 0 |
| CA_40C | Yes | Yes | | Yes | 40 | 0 |
| CA_41C | Yes | Yes | Yes | Yes | 40 | 0 |

In the table above, the CA configuration represents an operation hand and a CA bandwidth class. For example, CA_1C means an operation band2 of the table 1 and a CA band class C of the table 2. All CA operation classes may be applied to bands not shown in the table above.

Figure 10:
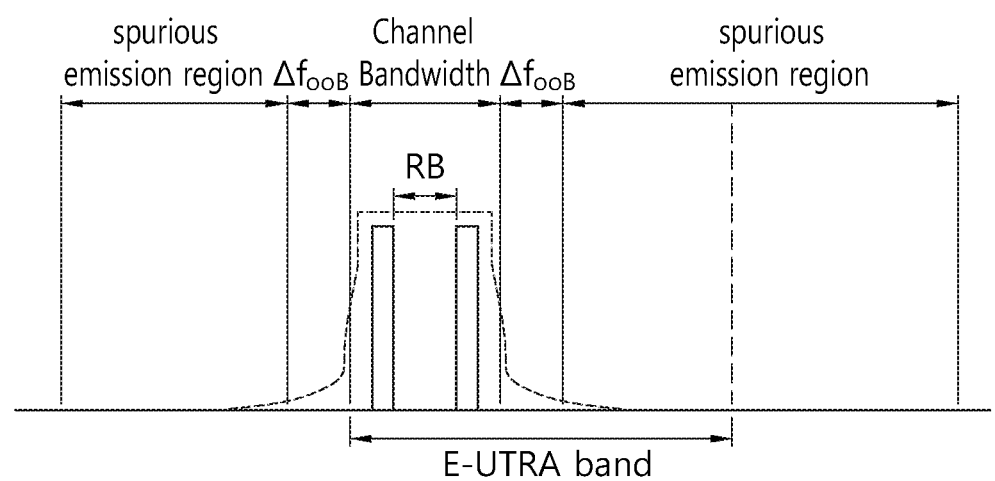
FIG. 10 illustrates the concept of unwanted emission.
Figure 11:
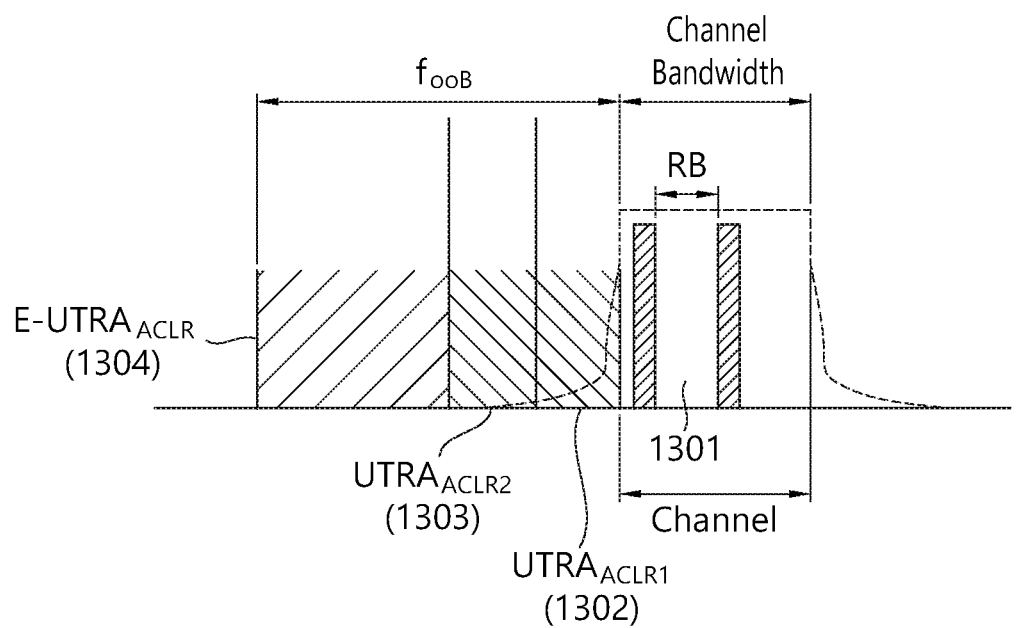
FIG. 11 specifically illustrates out-of-band emission of the unwanted emission shown in FIG. 10.

FIG. 10 illustrates the concept of unwanted emission. FIG. 11 specifically illustrates out-of-band emission of the unwanted emission shown in FIG. 10.

As can be seen from FIG. 10, a transmission modem sends a signal over a channel bandwidth assigned in an E-UTRA band.

Unwanted emission arises in the band of $\Delta f_{OOB}$, and as shown, unwanted emission also occurs on the spurious area. Here, $\Delta f_{OOB}$ means the magnitude in the out-of-band (OOB). Meanwhile, the out-of-band omission refers to the one that arises in a band close to an intended transmission band. The spurious emission means that unwanted waves spread up to a frequency band that is far away from the intended transmission band.

Meanwhile, 3GPP release 10 defines basic SE (spurious emission) that should not be exceeded according to a frequency range.

Referring to FIG. 11, if transmission is conducted in the E-UTRA channel band 1301, leakage, i.e., unwanted emission, occurs to out-of-bands (1302, 1303, and 1304 in the shown $f_{OOB}$ area).

Figure 13:
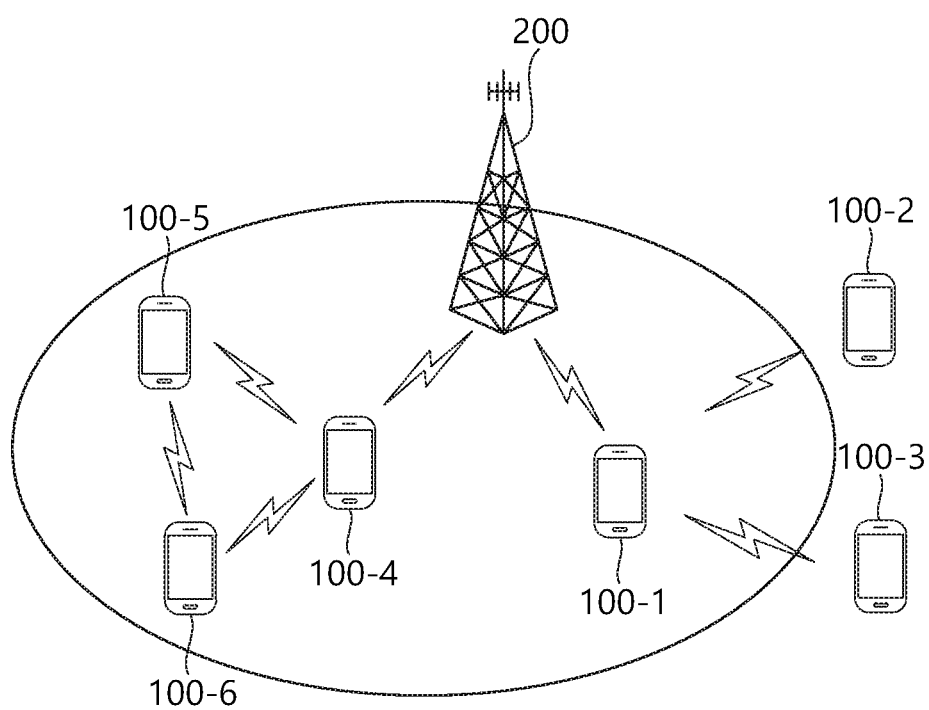
FIG. 13 illustrates the concept of D2D (Device to Device) communication expected to be introduced in the next generation communication system.

Here, $UTRA_{ACR1}$ denotes a ratio of leakage to a channel 1302 to an E-UTRA channel 1301, i.e., an adjacent channel leakage ratio, in case the adjacent channel 1302 is the one for UTRA when a terminal conducts transmission on the E-UTRA channel 1301. $UTRA_{ACLR2}$ is a ratio of leakage to a channel 1303 (a UTRA channel) located to the adjacent channel 1302, i.e., an adjacent channel leakage ratio, in case the channel 1303 is the one for UTRA, as shown in FIG. 13. E-UTRA$_{ACLR}$ is a ratio of leakage to an adjacent channel 1304 (i.e., an E-UTRA channel) when the terminal conducts transmission through the E-UTRA channel 1301, i.e., an adjacent channel leakage ratio.

As set forth above, if transmission is conducted in an assigned channel band, unwanted emission occurs to adjacent channels.

As described above, unwanted emission arises to bands adjacent to each other. At this time, with respect to interference caused by transmission from the base station, the amount of interference to adjacent bands may be reduced to an allowed reference or less by designing a high-price and bulky RF filter in view of the base station's nature. On the contrary, in the case of the terminal, it is difficult to completely prevent interference to adjacent bands due to, e.g., the limited size of terminal and limited price of the power amplifier or pre-duplex filter RF device.

Accordingly, the terminal's transmission power needs to be limited.

Figure 12:
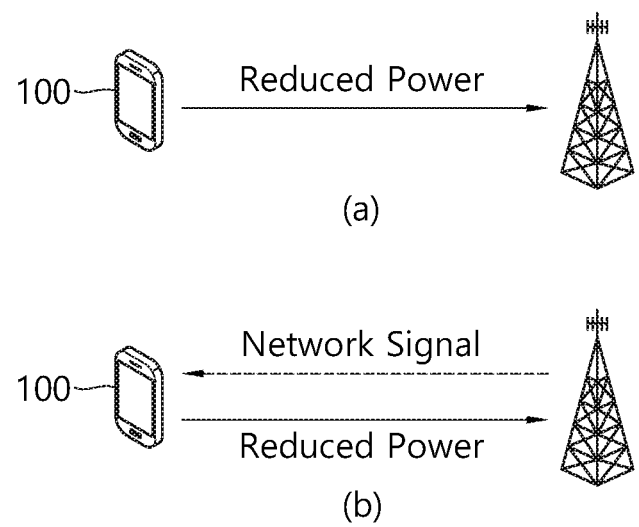
FIG. 12 illustrates an example of a method of limiting transmission power of a terminal.

FIG. 12 illustrates an example of a method of limiting transmission power of a terminal.

As can be seen from (a) portion of FIG. 12, the terminal 100 conducts transmission with transmission power limited In case a PAPR (peak-to-average power ratio) is increased, linearity of the power amplifier (PA) is reduced, as an MPR (maximum power reduction) value for limiting transmission power, an MPR value up to 2 dB may apply depending on modulation schemes in order to maintain such linearity. This is shown in the following table.

TABLE 7

| | Channel bandwidth/Transmission bandwidth (NRB) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

Above table represents MPR values for power classes 1 and 3.

<MPR Per 3GPP Release 11>

Meanwhile, according to 3GPP release 11, the terminal adopts multi-cluster transmission in a single CC (component carrier) and may simultaneously transmit a PUSCH and a PUCCH. As such, if the PUSCH and the PUCCH are transmitted at the same time, the size of the IM3 component (which means a distortion signal generated by intermodulation) that occurs at an out-of-band area may be increased as compared with the existing size, and this may serve as larger interference to an adjacent band. Thus, the following MPR value may be set so as to meet general spurious emission, ACLR (adjacent channel leakage ratio) and general SEM (spectrum emission mask) that are the terminal's emission requirements that should be observed by the terminal upon uplink transmission.

$$MPR = CEIL\{M_A, 0.5\} \quad \text{[Equation 1]}$$

Here, $M_A$ is as follows.

$M_A = [8.0]-[10.12]A;\ 0<A\leq[0.33]$
$[5.67]-[3.07]A;\ [0.33]<A\leq[0.77]$
$[3.31];\ [0.77]<A\leq[1.0]$ Here, A is as follows.

$A = N_{RB\_alloc}/N_{RB\_agg}$.

$N_{RB\_agg}$ is the number of RBs in the channel band, and $N_{RB\_alloc}$ is the total number of RBs that are transmitted at the same time.

CEIL$\{M_A, 0.5\}$ is a function that rounds off on a per-0.5 dB basis. That is, MPR∈[3.0 3.5 4.0 4.5 5.0 5.5 6.0 6.5 7.0 7.5 8.0].

The MPR value shown in Equation above is the one that applies when a general PA (power amplifier) is used. If a high efficiency power amplifier (HEPA) that is recently being researched is used, an MPR value of a higher level may be needed. However, despite its advantage that it may reduce power consumption and heat radiation by 30% or more, the HEPA suffers from reduced cell coverage that comes from demand of a larger MPR value. Further, since linearity is guaranteed only up to 20 MHz to date, linearity is not insured considering carrier aggregation (CA).

<General MPR>

Taking the CA into account, the channel bandwidth of uplink, meanwhile, may be increased up to 40 MHz (20 MH+20 MHz), and accordingly, a larger MPR value is needed.

TABLE 8

| | CA bandwidth Class C | | | | |
|---|---|---|---|---|---|
| Modulation | 50 RB + 100 RB | 75 RB + 75 RB | 75 RB + 100 RB | 100 RB + 100 RB | MPR (dB) |
| QPSK | >12 and ≤50 | >16 and ≤75 | >16 and ≤75 | >18 and ≤100 | ≤1 |
| QPSK | >50 | >75 | >75 | >100 | ≤2 |
| 16 QAM | ≤12 | ≤16 | ≤16 | ≤18 | ≤1 |
| 16 QAM | >12 and ≤50 | >16 and ≤75 | >16 and ≤75 | >18 and ≤100 | ≤2 |
| 16 QAM | >50 | >75 | >75 | >100 | ≤3 |

Above table represents MPR values for power class 3.

As in the above table, in the case of class C of intra contiguous CA, an MPR value up to 3 dB may apply depending on modulation schemes. Meanwhile, under the environment of CA class C, the MPR value as follows should be met considering multi-cluster transmission.

$$MPR = CEIL\{M_A, 0.5\} \quad \text{[Equation 2]}$$

Here, $M_A$ is as follows.
MA=8.2; 0≤A<0.025
9.2-40A; 0.025≤A<0.05
8-16A; 0.05≤A<0.25
4.83-3.33A; 0.25≤A≤0.4,
3.83-0.83A; 0.4≤A≤1, <A-MPR Based on LTE>

As can be seen from (b) portion of FIG. 12, a BS may apply A-MPR (additional maximum power reduction) by transmitting an NS (network signal) to a terminal 100. Unlike the aforementioned MPR, in order not to have an effect on adjacent bands or the like, the A-MPR is an operation in which the BS transmits the NS to the terminal 100 operating in a specific operating band so that the terminal additionally performs power reduction. That is, when a terminal to which the MPR is applied receives the NS, transmission power is determined by additionally applying the A-MPR.

<D2D(Device to Device) Communication>

On the other hand, the D2D communication expected to be introduced in the next generation communication system will be described below.

FIG. 13 illustrates the concept of D2D (Device to Device) communication expected to be introduced in the next generation communication system.

Due to user's needs for SNS (Social Network Service), communication between UEs physically close to each other, that is, D2D (Device to Device) communication has been required.

In order to reflect the above-described requirements, as illustrated in FIG. 13, it has been discussed that a method which is capable of directly communicating without intervention of the base station (eNodeB) 200, among UE #1 100-1, UE #2 100-2, and UE #3 100-3, or UE #4 100-4 UE #5 100-5, and UE #6 100-6. Of course, with the help of the base station (eNodeB) 200, it is possible to directly communicate between the UE #1 100-1 and the UE #4 100-4. Meanwhile, the UE #4 (100-4) may serve as a repeater for the UE #5 (100-5) and the UE #6 (100-6). Likewise, the UE #1 100-1 may serve as a repeater for UE #2 (100-2) and UE #3 (100-3) far from the cell center.

Meanwhile, D2D communication is also called Proximity Service (ProSe). The UE performing the proximity service is also referred to as a ProSe UE. Further, a link among UEs used in the D2D communication is also referred to as a side link. A frequency band that may be used for the side link is as follows.

TABLE 9

| Side link band | E-UTRA band | Transmission $F_{UL\_low}$-$F_{UL\_high}$ | Reception $F_{DL\_low}$-$F_{DL\_high}$ | Duplex mode |
|---|---|---|---|---|
| 2 | 2 | 1850 MHz-1910 MHz | 1850 MHz-1910 MHz | HD |
| 3 | 3 | 1710 MHz-1785 MHz | 1710 MHz-1785 MHz | HD |
| 4 | 4 | 1710 MHz-1755 MHz | 1710 MHz-1755 MHz | HD |
| 7 | 7 | 2500 MHz-2570 MHz | 2500 MHz-2570 MHz | HD |
| 14 | 14 | 788 MHz-798 MHz | 788 MHz-798 MHz | HD |
| 20 | 20 | 832 MHz-862 MHz | 832 MHz-862 MHz | HD |
| 26 | 26 | 814 MHz-849 MHz | 814 MHz-849 MHz | HD |
| 28 | 28 | 703 MHz-748 MHz | 703 MHz-748 MHz | HD |
| 31 | 31 | 452.5 MHz-457.5 MHz | 452.5 MHz-457.5 MHz | HD |
| 41 | 41 | 2496 MHz-2690 MHz | 2496 MHz-2690 MHz | HD |

Physical channels used for the sidelink are as follows.
PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

Further, physical signals used in the side link are as follows.
DMRS (Demodulation Reference signal)
SLSS (Sidelink Synchronization signal)

The SLSS includes a PSLSS (primary sidelink synchronization signal) and a SSLSS (secondary sidelink synchronization signal).

Figure 14:
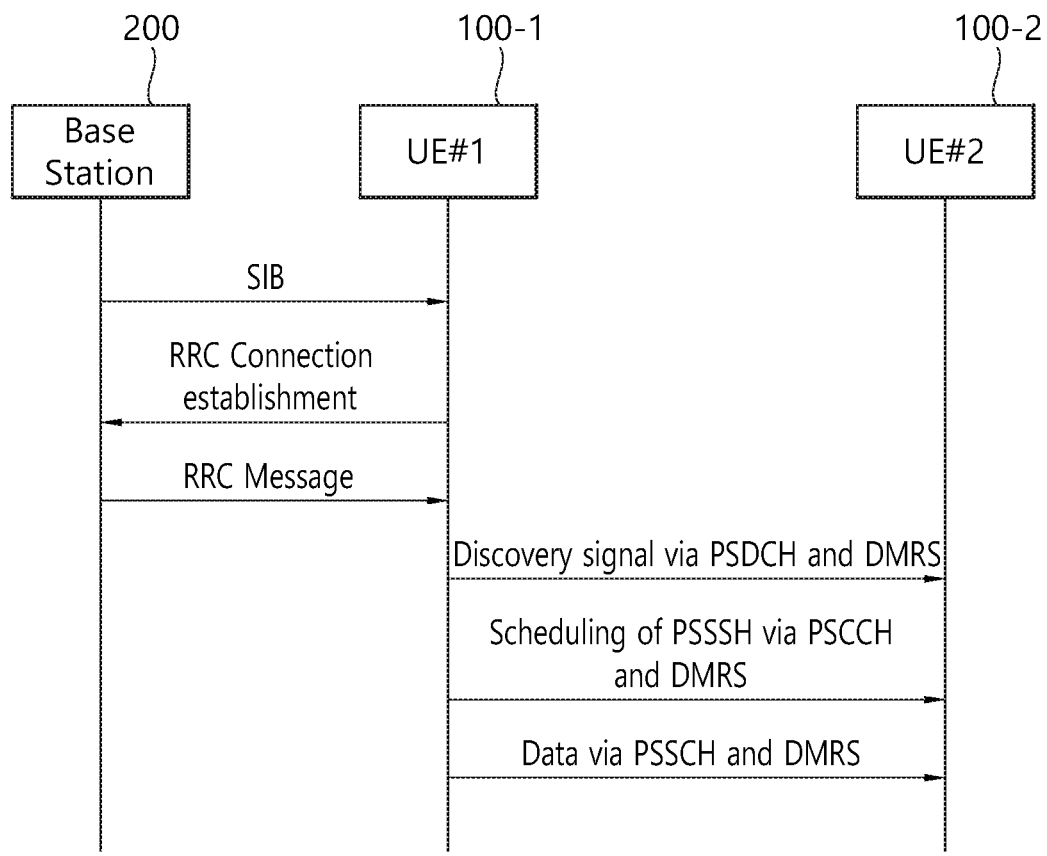
FIG. 14 illustrates an example of D2D communication or ProSe communication between UE #1 and UE #2 illustrated in FIG. 13.

FIG. 14 illustrates an example of D2D communication or ProSe communication between UE #1 and UE #2 illustrated in FIG. 13.

Referring to FIG. 14, the BS 200 broadcasts a System Information Block (SIB) in a cell.

The SIB may include information on resource pools related to D2D communication. Information on the resource pool related to the D2D communication may be divided into SIB type 18 and SIB type 19.

The SIB type 18 may include resource configuration information for D2D communication. Further, the SIB type 19 may include resource setting information related to a D2D discovery.

The SIB type 19 includes the discSyncConfig as shown below.

TABLE 10

| SIB Type 19 |
|---|
| discSyncConfig Indicates a configuration as to whether the UE is allowed to receive or transmit synchronization information. |

TABLE 10-continued

| SIB Type 19 |
|---|
| The base station (E-UTRAN) can set discSyncConfig when the UE intends to transmit synchronization information using dedicated signaling when it intends to use the dedicated signaling to allow |

The discSyncConfig includes SL-SyncConfig. The SL-SyncConfig includes configuration information for SLSS reception and SLSS transmission as shown in the following table.

TABLE 11

| SL-SyncConfig field description | |
|---|---|
| discSyncWindow | Also called a searching window. Indicates a synchronization window in which the UE expects the SLSS. The value can be set to w1 or w2. The value w1 represents 5 milliseconds, and the value w2 corresponds to the length of the normal CP divided by 2. |
| syncTxPeriodic | Indicates whether the UE transmits the SLSS once or periodically (e.g. every 40 ms) within each period of a discovery signal transmitted by the UE. For the periodic transmissions, the UE also transmits a MasterInformationBlock-SL. |
| syncTxThreshIC | Represents a threshold used when in coverage. If the RSRP value measured for the counterpart UE (recognized as a cell) selected for sidelink communication is lower than the threshold value, the UE may transmit the SLSS for the sidelink communication with the counterpart UE. |
| txParameters | Includes a parameter for a configuration for transmission. |

Meanwhile, the UE #1 100-1 located within the coverage of the base station 200 establishes an RRC connection with the base station.

Further, the UE #1 100-1 receives an RRC message, e.g., an RRC Connection Reconfiguration message from the BS 200. The RRC message includes a discovery configuration (hereinafter referred to as a discConfig). The discConfig includes configuration information for a discover resource pool (hereinafter referred to as a DiscResourcePool) for discovery. The DiscResourcePool includes information as shown in the following table.

TABLE 12

| | DiscResourcePool |
|---|---|
| discPeriod | May be noted as a discovery period, and is also called a PSDCH period, as a period of resources allocated in a cell for transmission/reception of a discovery message. The values may be rf32, rf64, rf128, rf256, rf512, rf1024, or the like. These values represent the number of radio frames. That is, when the value is rf32, it represents 32 radio frames. |
| numRepetition | Indicates the number of times that the subframe Bitmap is repeated for mapping to the subframe occurred in the discPeriod. The base station configures numRepetition and subframeBitmap so that the mapped subframe ca not exceed the discPeriod. |
| TF-ResourceConfig | Assigns a set of time/frequency resource used in the sidelink communication. |

The TF-ResourceConfig includes information as shown in the following table.

TABLE 13

```
SL-TF-ResourceConfig-r12 ::=   SEQUENCE {
    prb-Num-r12                    INTEGER (1..100),
    prb-Start-r12                  INTEGER (0..99),
    prb-End-r12                    INTEGER (0..99),
    offsetIndicator-r12            SL-OffsetIndicator-r12,
    subframeBitmap-r12             SubframeBitmapSL-r12
}
```

The SubframeBitmapSL is as in the following table.

TABLE 14

| SubframeBitmapSL | May be noted as discoverySubframeBitmap, and assingns a subframe bitmap indicating the resources used for the side link. The value may be designated as bs4, bs8, bs12, bs16, bs30, bs40, bs40, or the like. For example, the bs40 refers to a bit string length of 40. |
|---|---|

The SL-OffsetIndicator includes information as shown in the following table.

TABLE 15

| SL-OffsetIndicator | May be noted as discoveryOffsetIndicator, and indicates an offset in a first period of the resource pool within the SFN cycle. |
|---|---|
| SL-OffsetIndicatorSync | May be noted as SyncOffsetIndicator, indicates the relationship between subframes and SFNs containing synchronous resources based on an equation (SFN * 10 + Subframe Number) mod 40 = SL-OffsetIndicatorSync. |

Meanwhile, the UE #1 100-1 may transmit a discovery signal through the PSDCH in order for the UE #1 to detect whether there is a suitable UE in the vicinity thereof for D2D communication or ProSe communication, or inform its presence.

Also, the UE #1 100-1 may transmit a scheduling assignment (SA) through the PSCCH. The UE #1 100-1 may transmit a PSSCH including data based on the scheduling assignment (SA).

Figure 15:
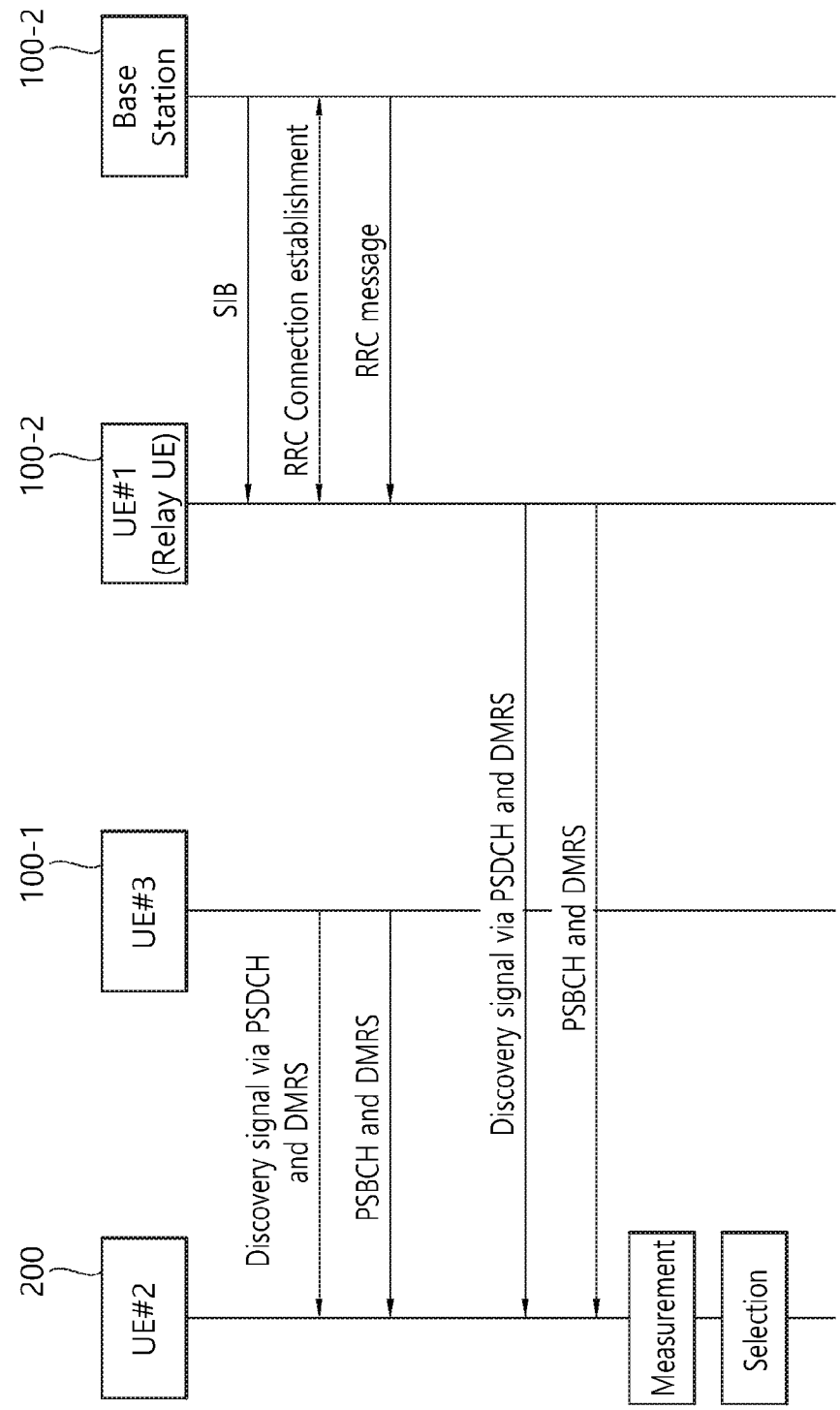
FIG. 15 illustrates an example in which UE #2 shown in FIG. 13 selects a Relay UE.

FIG. 15 illustrates an example in which UE #2 shown in FIG. 13 selects a Relay UE.

Referring to FIG. 15 along with FIG. 13, the UE #2 100-2 located outside the coverage of the base station receives the discovery signal from neighboring UEs and a DMRS for demodulation of the discovery signal, in order to communicate with the UE #1 100-1 which is located within the coverage of the base station and thus operates as the Relay UE. Also, the UE #2 100-2 receives a PSBCH from the neighboring UEs and a DMRS for demodulating the PSBCH.

Then, the UE #2 100-2 performs a measurement based on the received signals.

The measurement includes a measurement of S-RSRP (Sidelink Reference Signal Received Power) and a measurement of SD-RSRP (Sidelink Discovery Reference Signal Received Power).

Here, the S-RSRP means an average received power on an RE (Resource Element) including a DMRS for demodulating a PSBCH received in the middle six PBBs. In this case, the power per RE is determined from the energy received on the portion excluding the CP portion in the OFDM symbol.

The SD-RSRP means the average reception power on the RE including the DMRS for demodulating the PSDCH, when the CRC check is successful in accordance with successful decoding of the PSDCH including the discovery signal.

Upon completion of the measurement, the UE #2 100-2 selects the UE #1 100-1 capable of operating as the Relay UE based on the measurement result, that is, the measurement result of the SD-RSRP.

<V2X(Vehicle-to-Everything)>

The above-mentioned D2D may also be applied to vehicle-to-everything (V2X). The V2X collectively refers to communication technology through all interfaces with vehicles. The implementation of V2X may be as follows.

First, in the V2X, 'X' may be a vehicle (VEHICLE). In this case, the V2X may be referred to as vehicle-to-vehicle (V2V), which may mean communication between vehicles.

Figure 16:
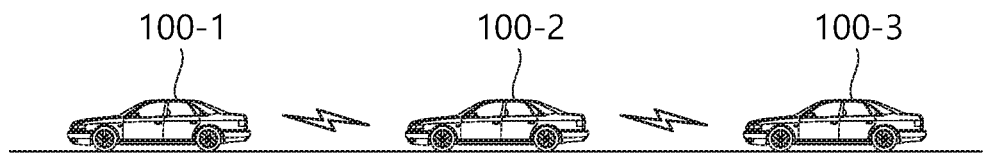
FIG. 16 is an exemplary diagram of illustrating a concept of V2X.

FIG. 16 is an exemplary diagram of illustrating a concept of V2X.

As may be seen with reference to FIG. 16, the vehicles (i.e., wireless devices mounted on the vehicle) 100-1, 100-2, and 100-3 can communicate with each other.

Meanwhile, in V2X, 'X' can mean a person (Person) or a pedestrian (PEDESTRIAN). In this case, V2X may be represented as vehicle-to-person or vehicle-to-pedestrian (V2P). Here, the pedestrian is not necessarily limited to a person walking on a pedestrian, and may include a person riding a bicycle, a driver or a passenger of a vehicle (with a speed lower than a certain speed).

Or 'X' may be an infrastructure (Infrastructure)/network (Network). In this case, the V2X may be referred to as vehicle-to-infrastructure (V2I) or vehicle-to-network (V2N) and may refer to the communication between the vehicle and the ROADSIDE UNIT (RSU) or between the vehicle and the network. The roadside apparatus may be a transportation-related infrastructure, e.g., an apparatus for indicating speed. The roadside apparatus may be implemented in a base station or a fixed terminal.

On the other hand, it is expected that the V2X terminal can use a transmission power higher than that of a user equipment because the V2X terminal has no limitation to a battery unlike a terminal.

However, in order to globally sale a V2X terminal, regulation of each country should be satisfied. Particularly in an EU, there are many regulations for protecting frequencies from interferences of V2X terminal. Accordingly, there is a need for researches and studies for a scheme to satisfy the regulations.

<Disclosure of the Present Invention>

In effort to achieve the goal, the disclosure of the present invention provides approaches for protecting an existing system (for example, Tolling system).

I. First Approach for Protecting an Existing System by Using a Network Signal for A-MPR A below table is a specification of captured in ETSI 102 792 v1.2.1. Accordingly, a specification to be satisfied is changed according to what is a corresponding system and how much is max. power of a real V2X terminal.

A generally normal mode should satisfy 5795~5815 MHz with −30 dB/MHz. A coexistence mode has different specifications according to a coexistence mode from −65 dB to −30 dB.

Output power level and unwanted emissions for ITS stations are regulated. Operation limited only by these requirements is referred to as normal mode.

Normal Mode

TABLE 16

| ITS-G5 output power level in the frequency range 5 855 MHz to 5 925 MHz (dBm EIRP) | ITS-G5 unwanted emissions in the frequency range 5 795 MHz to 5 815 MHz (dBm/MHz EIRP) |
| --- | --- |
| ≤33 | ≤−30 |

Coexistence Mode

In coexistence mode, additional restrictions apply. These restrictions apply to output power level, unwanted emissions and transmit timing. The restrictions are designed to decrease the interference from ITS stations to a level which implies no harmful performance degradation of CEN DSRC based toll stations.

An ITS station may be designed to operate in coexistence mode all the time.

Four different coexistence modes, designated A, B, C, and D are defined An ITS station shall choose one of these modes when applicable.

TABLE 17

| Coexistence mode | ITS output power level in the frequency range 5 855 MHz to 5 925 MHz (dBm EIRP) | ITS unwanted emissions in the frequency range 5 795 MHz to 5 815 MHz (dBm/MHz EIRP) | $T_{on}$ time | $T_{off}$ time |
| --- | --- | --- | --- | --- |
| A | ≤10 | ≤−65 | no limit | no limit |
| B | ≤10 | ≤−45 | ≤1 ms | ≥50 ms |
| C | ≤33 | ≤−30 | ≤1 ms | |
| D | ≤33 | ≤−30 | 1 ms to 7 ms | |

Based on the above tables, the coexistence requirement can be changed for up to 33 dBm V2X Tx power as below.

TABLE 18

| E-UTRA Band | Protected band | Frequency range (MHz) | Maximum Level (dBm) | MBW (MHz) |
| --- | --- | --- | --- | --- |
| 47 | E-UTRA Band 1, 3, 5, 7, 8, 22, 26, 28, 34, 39, 40, 41, 42, 44, 45, 65 | $F_{DL\_low}$-$F_{DL\_high}$ | −50 | 1 |
| | Frequency range | 5925-5950 | −30 | 1 |
| | Frequency range | 5815-5855 | −30 | 1 |
| | Frequency range | 5795-5815 | −30 or −65 | 1 |

Then it needs additional simulation for required A-MPR with revised simulation parameters for NS_XX (with −30 dB) and NS_XY (with −65 dB).

A method of using a network signal is useful to have small values than absolute value as 13 dB since the A-MPR level can be reduced by RB starting position and contiguous RB size.

When V2X UE use the geometrical preconfigured parameters, then NS_XY for −65 dB protection can be applied in the some specific region near by CEN DSRC tolling system.

Other case, only applied NS_XX with −30 dBm in EU.

II. Second Approach for Protecting an Existing System by Using a Network Signal for A-MPR The following identified issues should be solved.

Issue 1: MPR for PSCCH+PSSCH on adjacent/non-adjacent PRBs need further study

Issue 2: A-MPR for PSCCH+PSSCH on adjacent/non-adjacent PRBs need further study

Issue 3: Additional spurious emissions (Tx and Rx) for Region 1 requires further study Issue 4: Region 1 additional receiver blocking requirement of −30 dBm at offset of +−50 MHz from the channel center frequency needs further study Issue 5: Further study impacts on RF requirements due to simultaneous PSCCH and PSSCH transmissions In this contribution, it is provided how to define A-MPR requirements based on European regulation for LTE-based V2V UE to cover the remaining issue 2 and 3.

II-1. A-MPR Simulation Assumption

For LTE-based V2X UE at Band 47, the additional transmission requirements are defined based on European regulation. So LTE-based V2X UE in Europe shall satisfy the additional spurious emission requirements and A-SEM in a certain frequency ranges when UE received NS_XX from pre-configured radio parameters in a certain region.

However, the e.i.r.p based additional SE requirements are not decide the actual level for conducted test mode.

The follow test parameters are provided for A-MPR simulation.

Basic Simulation Assumption and Parameters

Channel BW: 10 MHz (Fc=5860 MHz)

Modulation schemes: quadrature phase shift keying (QPSK), 16 quadrature amplitude modulation (QAM)

Modulator impairments

I/Q imbalance: 25 dBc

Carrier leakage: 25 dBc

Counter IM3: 60 dBc

ACLR requirement is listed in below table.

TABLE 19

| Channel arrangement | Minimum channel spacing with 1 MHz Guard band |
|---|---|
| E-UTRA$_{ACLR}$ for V2X UE | 30 dB |
| Adjacent channel centre frequency offset (in MHz) | +10/−10 |
| E-UTRA channel Measurement bandwidth | 9 MHz |

General SEM requirement for V2X UE is listed in below table.

TABLE 20

| | Spectrum emission limit (dBm)/Channel bandwidth | | | | | | |
|---|---|---|---|---|---|---|---|
| Δf$_{OOB}$ (MHz) | 1.4 MHz | 3.0 MHz | 5 MHz | 10 MHz | 15 MHz | 20 MHz | Measurement bandwidth |
| ±0-1 | −10 | −13 | −15 | −18 | −20 | −21 | 30 kHz |
| ±1-2.5 | −10 | −10 | −10 | −10 | −10 | −10 | 1 MHz |
| ±2.5-2.8 | −25 | −10 | −10 | −10 | −10 | −10 | 1 MHz |
| ±2.8-5 | | −10 | −10 | −10 | −10 | −10 | 1 MHz |
| ±5-6 | | −25 | −13 | −13 | −13 | −13 | 1 MHz |
| ±6-10 | | | −25 | −13 | −13 | −13 | 1 MHz |
| ±10-15 | | | | −25 | −13 | −13 | 1 MHz |
| ±15-20 | | | | | −25 | −13 | 1 MHz |
| ±20-25 | | | | | | −25 | 1 MHz |

Additional SEM requirement for V2X UE in region 1 is listed in below table.

TABLE 21

| | Spectrum emission limit (dBm)/Channel bandwidth | |
|---|---|---|
| ΔfOOB (MHz) | 10 MHz | Measurement bandwidth |
| ±0-0.5 | [−13-12(\|Δf$_{OOB}$\|/MHz)] | 100 kHz |
| ±0.5-5 | [−19-16/9(\|Δf$_{OOB}$\|/MHz − 0.5)] | 100 kHz |
| ±5-10 | [−27-2(\|Δf$_{OOB}$\|/MHz − 5.0)] | 100 kHz |

General SE requirement for V2X UE is listed in below table

TABLE 22

| Frequency Range | Maximum Level | Measurement bandwidth | NOTE |
|---|---|---|---|
| 9 kHz ≤ f < 150 kHz | −36 dBm | 1 kHz | |
| 150 kHz ≤ f < 30 MHz | −36 dBm | 10 kHz | |
| 30 MHz ≤ f < 1000 MHz | −36 dBm | 100 kHz | |
| 1 GHz ≤ f < 12.75 GHz | −30 dBm | 1 MHz | |
| 12.75 GHz ≤ f < 5th harmonic of the upper frequency edge of the UL operating band in GHz | −30 dBm | 1 MHz | 1 |
| 12.75 GHz-26 GHz | −30 dBm | 1 MHz | 2 |

NOTE 1:
Applies for Band 22, Band 42 and Band 43.
NOTE 2:
Applies for Band 47.

Additional SE requirement (SE UE-to-UE coexistence) for V2X UE is listed in below table.

TABLE 23

| | | Spurious emission | | | |
|---|---|---|---|---|---|
| E-UTRA Band | Protected band | Frequency range (MHz) | Maximum Level (dBm) | MBW (MHz) | NOTE |
| 47 | E-UTRA Band 1, 3, 5, 7, 8, 22, 26, 28, 34, 39, 40, 41, 42, 44, 45, 65 | F$_{DL\_low}$-F$_{DL\_high}$ | −50 | 1 | |
| | Frequency range | 5925-5950 | −30 | 1 | |
| | Frequency range | 5815-5855 | −30 | 1 | |
| | Frequency range | 5795-5815 | [−30] [−65] | 1 1 | 38 39 |

NOTE 38:
Applicable when NS_XX is configured by the pre-configured radio parameters for power class 3 V2X UE.
NOTE 39:
Applicable maximum power reduction schemes when CEN DSRC tolling system is nearby V2X UE. Need further discussion how to apply the MPR schemes II-2. A-MPR Simulation Results It needs to add additional SE UE-to-UE coexistence requirements with −30 dBm/MHz at 5795~5815 MHz for normal coexistence mode.

So, candidate solution are summarized as follow.

How to meet the ETSI regulation at 5795~5815 MHz
Candidate solution1: two A-MPR values according to NS_XX and NS_XY
Candidate solution2: Map information of navigation system in vehicle
Candidate solution3: D-MPR by upper layer indication (No DSRC detection in layer1)

Before the decide the solution to meet the ETSI regulation, its needs to study how much different A-MPR level between −30 dBm/MHz and −65 dBm/MHz to protect the DSRC tolling system at 5795~5815 MHz. So, the A-MPR simulation is performed based on the above simulation assumptions.

II-2-1. Additional SE Requirements with −30 dBm/MHz (NS_XX)

Figure 17A:
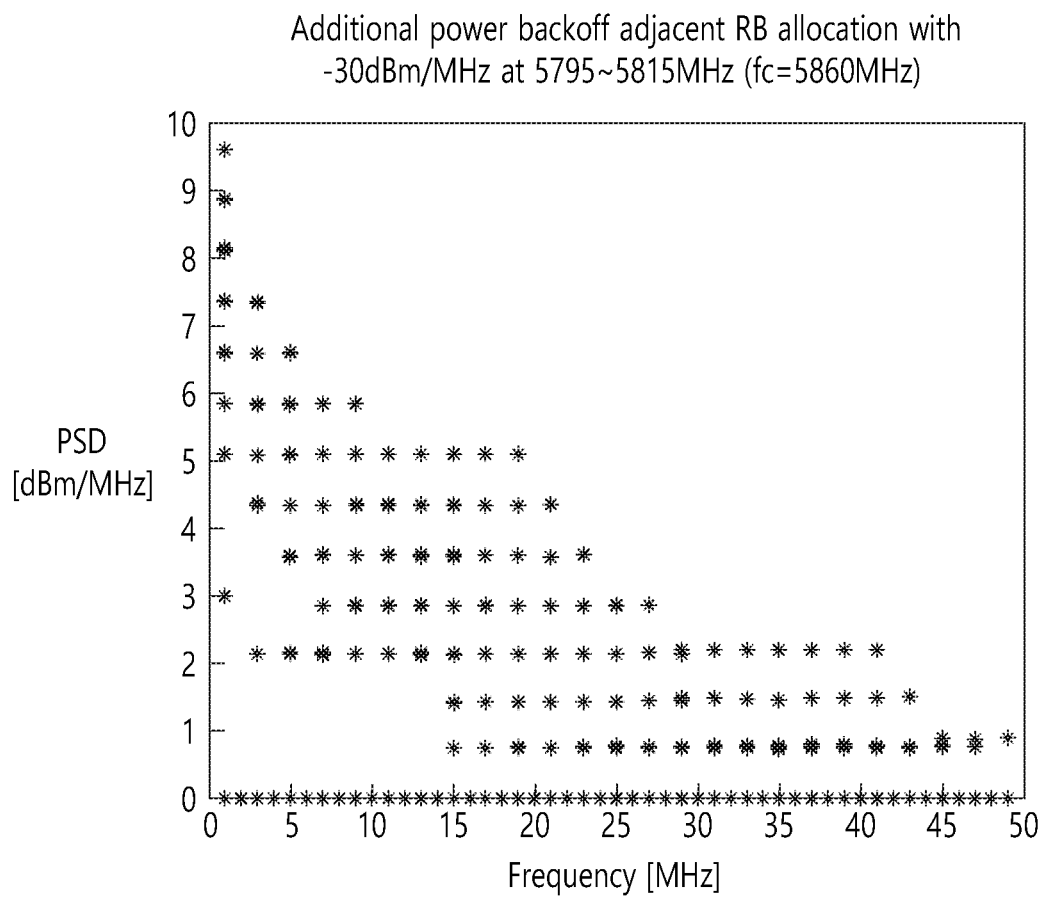
FIGS. 17a and 17b show the A-MPR results according to the adjacent/non-ad RB allocation, modulation schemes to protect 5795~5815 MHz with −30 dBm/MHz.
Figure 17B:
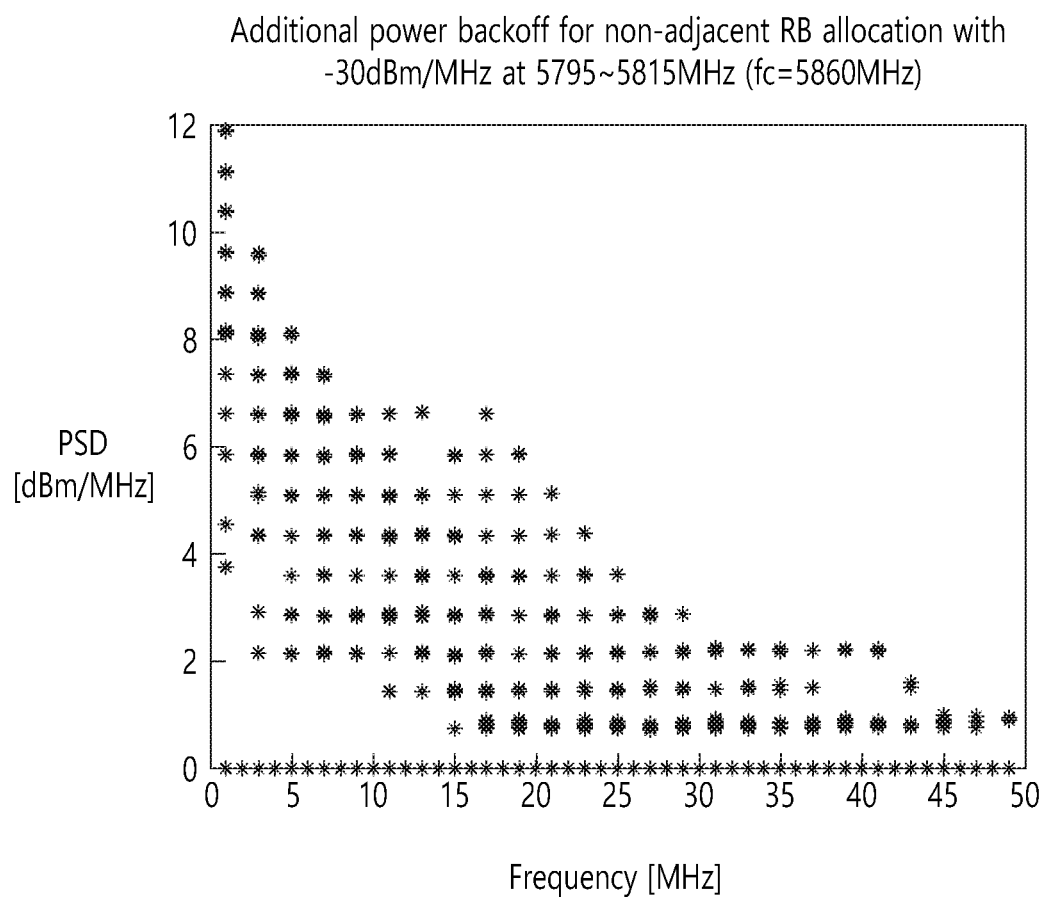

FIGS. 17*a* and 17*b* show the A-MPR results according to the adjacent/non-ad RB allocation, modulation schemes to protect 5795~5815 MHz with −30 dBm/MHz.

This A-MPR requirement will be applied to V2V UE in EU region as normal mode.

II-2-2. Additional SE Requirements with −65 dBm/MHz

Figure 18A:
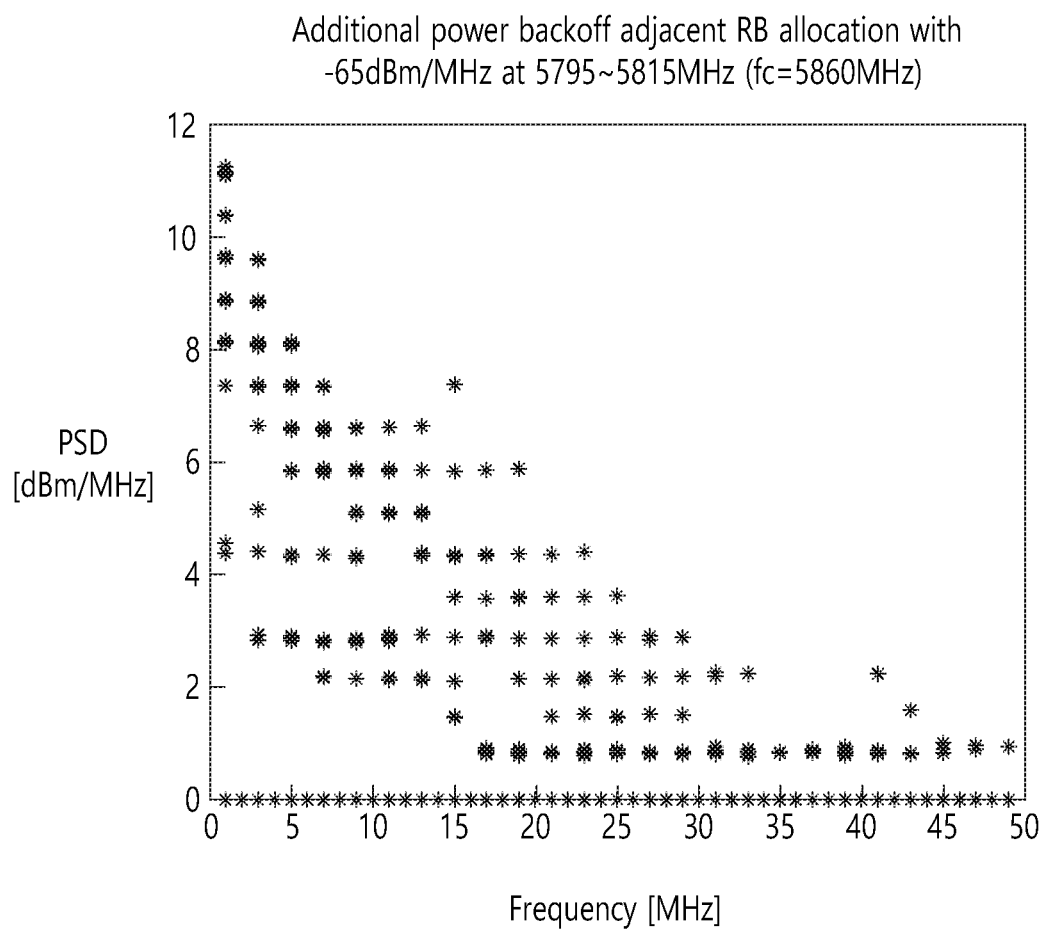
FIGS. 18a and 18b show the required additional power back-off simulation results according to the adjacent/non-adjacent RB allocation, modulation schemes to protect 5795~5815 MHz with −65 dBm/MHz.
Figure 18B:
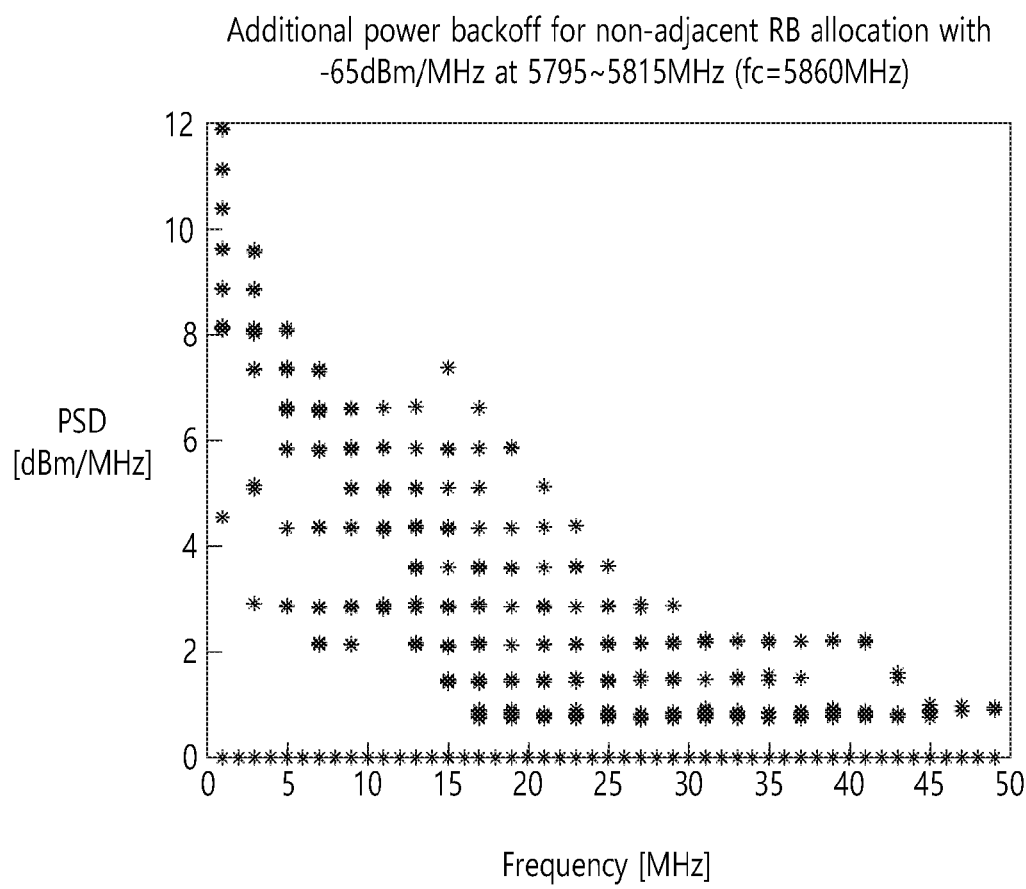

FIGS. 18*a* and 18*b* show the required additional power back-off simulation results according to the adjacent/non-adjacent RB allocation, modulation schemes to protect 5795~5815 MHz with −65 dBm/MHz.

This power back-off requirement will be applied to V2V UE in EU region as coexistence mode.

II-3. Conclusion

From the analysis, it is noted that the required additional back-off levels are quite similar according to the −30 dBm/MHz and −65 dBm/MHz limitation to protect DSRC tolling system at 5795~5815 MHz. So, one difficult coexistence limitation is considered to protect 5795~5815 MHz.

The required power back-off level is decided by A-MPR approach by NS_XX with −65 dBm/MHz at 5795~5815 MHz.

Therefore, the second approach proposes the A-MPR requirements for power class 3 LTE-based V2X UE to meet the some regional regulation requirements.

III. Third Approach for Protecting an Existing System by Using MPR

Third approach proposes MPR simulation results to keep the reasonable PAPR and cubic metric levels for FDM transmission with 3 dB boosting between PSCCH and PSSCH.

III-1. MPR Simulation Assumption

For LTE system, the cubic metric (CM) for SC-FDMA signal may be used as a metric to decide on the amount of power back-off for uplink transmission schemes. And, PSCCH and PSSCH may be simultaneously transmitted with adjacent or non-adjacent RB allocation by multiple DFT pre-coders. And 3 dB power may be boosted for PSCCH. Therefore it needs MPR/A-MPR re-simulation based on general RAN4 RF requirements as below.

Test metrics: Cubic metrics (<2.2 dB) and PAPR (<6.5 dB)
General parameters
Carrier frequency: 5.9 GHz
Modulation schemes: QPSK, 16QAM
  Only QPSK for PSCCH
Channel BWs: 10 MHz, 20 MHz
Adjacent/Non-Adjacent RB allocation between PSCCH and PSSCH
Consider 3 dB power boosting for PSCCH
PA operating point: E-UTRAACLR=30 dBc @ Pout=22 dBm for 100RB QPSK signal
Modulator IQ imbalance=25 dBc
Modulator carrier leakage=25 dBc
Modulator C_IM3=60 dBc III-2. MPR Simulation Results MPR level is decided, based on the MPR simulation results.

III-2-1. Adjacent RB Allocation with 3 dB Boosting

Based on the general simulation parameters, MPR to meet the test metric is derived.

Figure 19A:
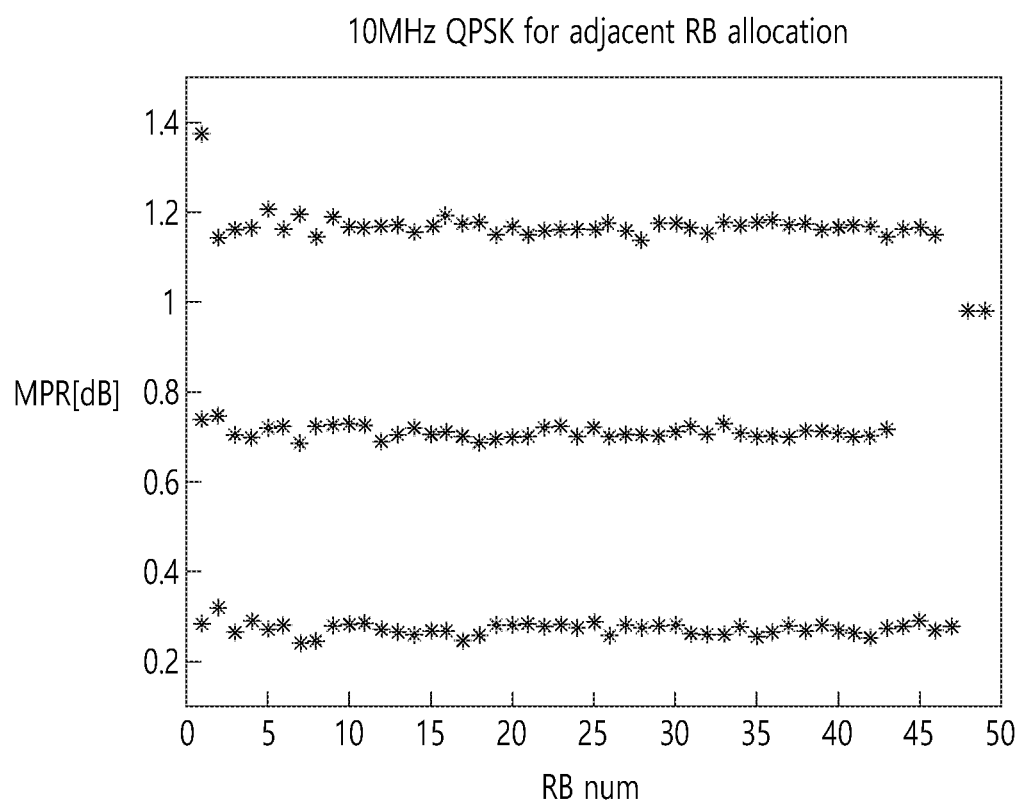
FIGS. 19a and 19b show the MPR simulation results according to a channel bandwidth of 10 MHz and modulation schemes for adjacent RB allocation with 3 dB power boosting.
Figure 19B:
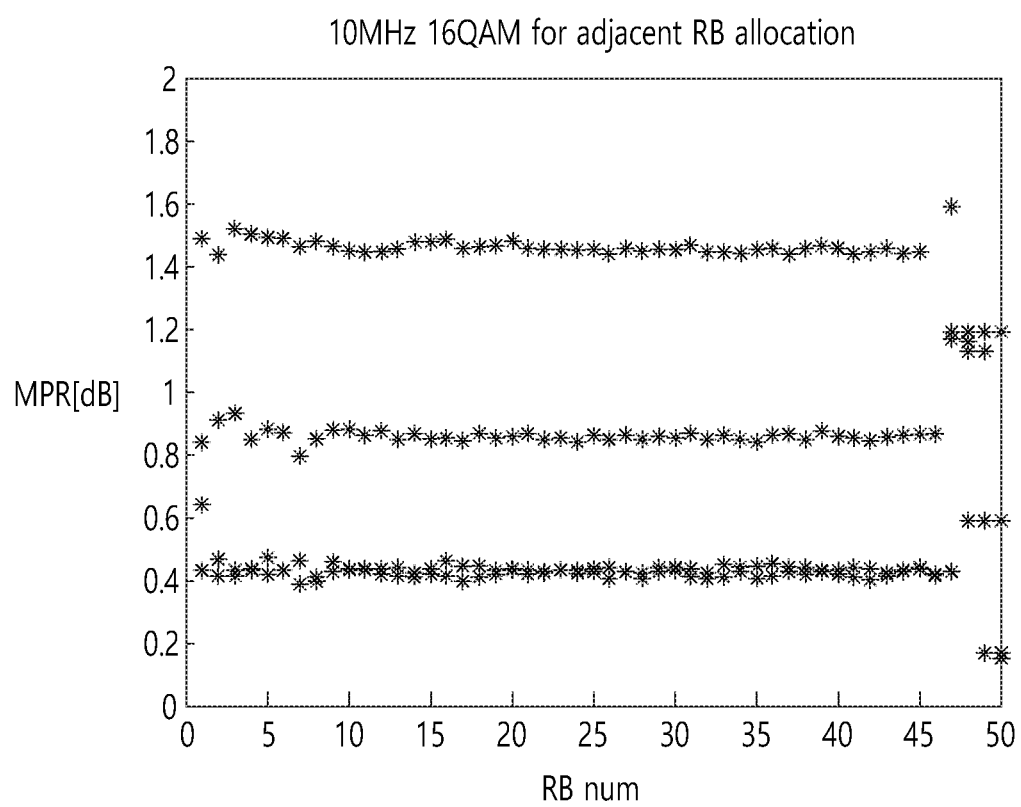

FIGS. 19a and 19b show the MPR simulation results according to a channel bandwidth of 10 MHz and modulation schemes for adjacent RB allocation with 3 dB power boosting.

In FIG. 19a, MPR simulation results for a channel bandwidth of 10 MHz and QPSK modulation are illustrated. Also, in FIG. 19b, MPR simulation results for a channel bandwidth of 10 MHz and 16-QAM modulation are illustrated FIGS. 20a and 20b show the MPR simulation results according to a channel bandwidth of 20 MHz and modulation schemes for adjacent RB allocation with 3 dB power boosting.

Figure 20A:
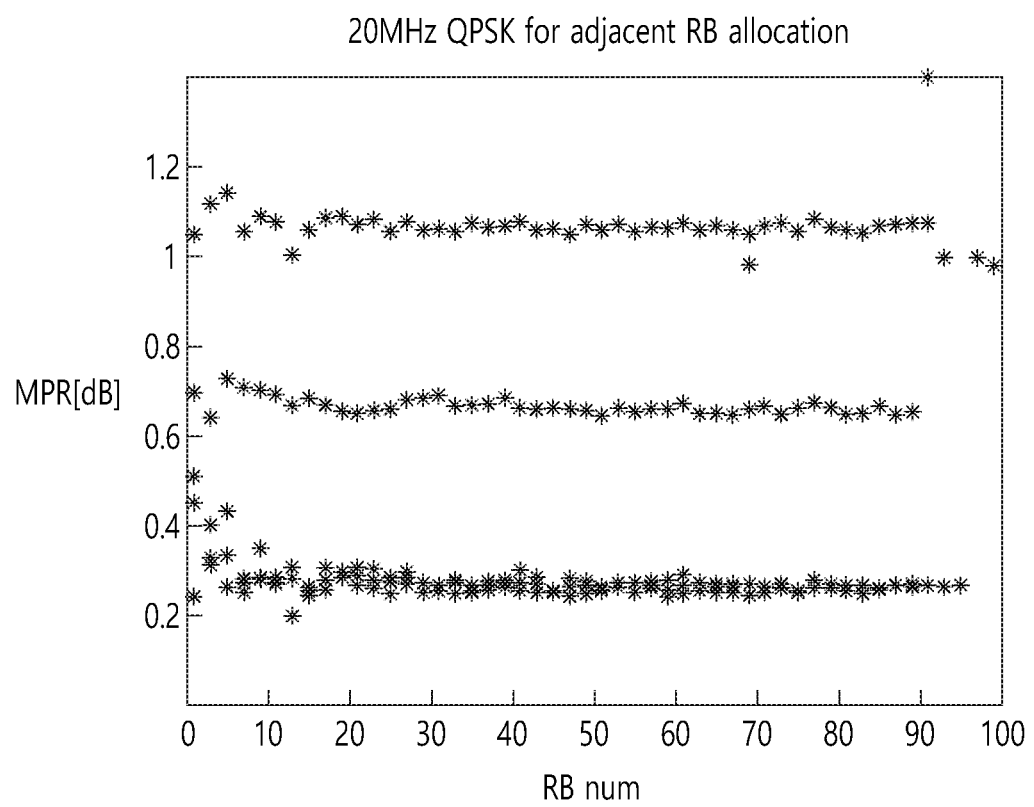
FIGS. 20a and 20b show the MPR simulation results according to a channel bandwidth of 20 MHz and modulation schemes for adjacent RB allocation with 3 dB power boosting.
Figure 20B:
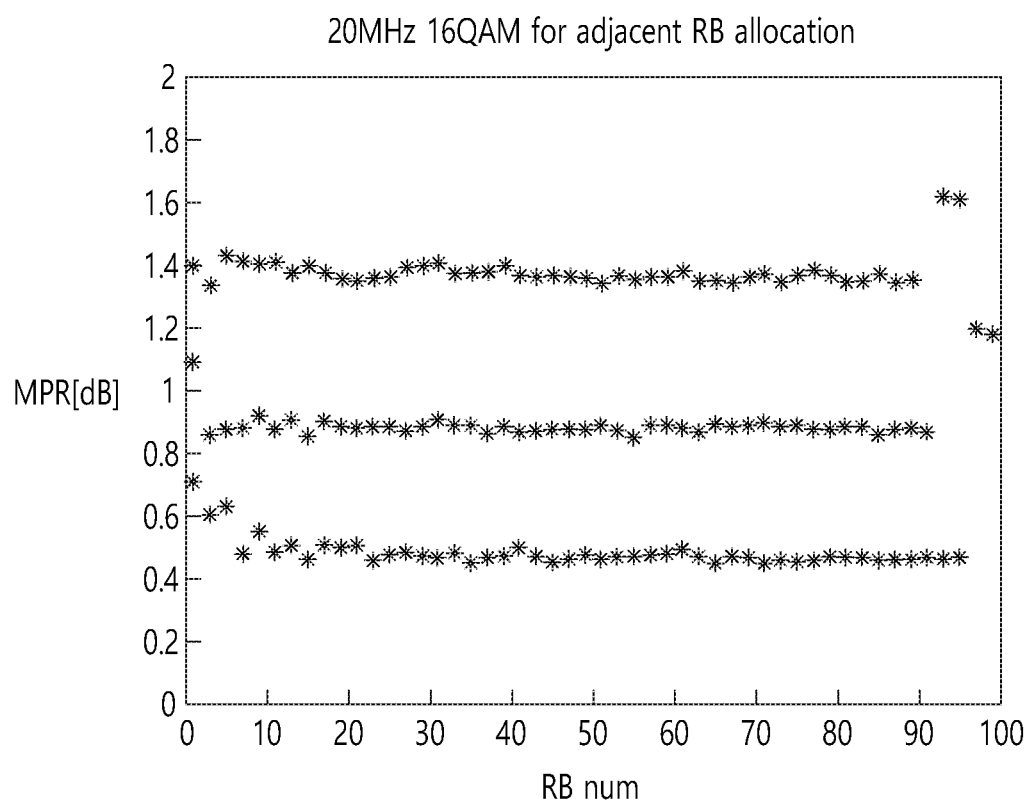

In FIG. 20a, MPR simulation results for a channel bandwidth of 20 MHz and QPSK modulation are illustrated. Also, in FIG. 20b, MPR simulation results for a channel bandwidth of 20 MHz and 16-QAM modulation are illustrated From the simulation results, the third approach proposes a below table to determine the MPR requirements for adjacent 1-DM transmissions with 3 dB power boosting.

TABLE 24

| Modulation | Channel bandwidth/Transmission bandwidth ($N_{RB}$) | | | | | | MPR (dB) |
|---|---|---|---|---|---|---|---|
| | 1.4 MHz | 3.0 MHz | 5 MHz | 10 MHz | 15 MHz | 20 MHz | |
| QPSK | | | | — | | — | ≤1.5 |
| 16 QAM | | | | — | | — | ≤2 |

The above table shows MPR for simultaneous PSCCH and PSSCH transmission with adjacent RB allocation.

III-2-2. Non-Adjacent RB Allocation with 3 dB Boosting

Figure 21A:
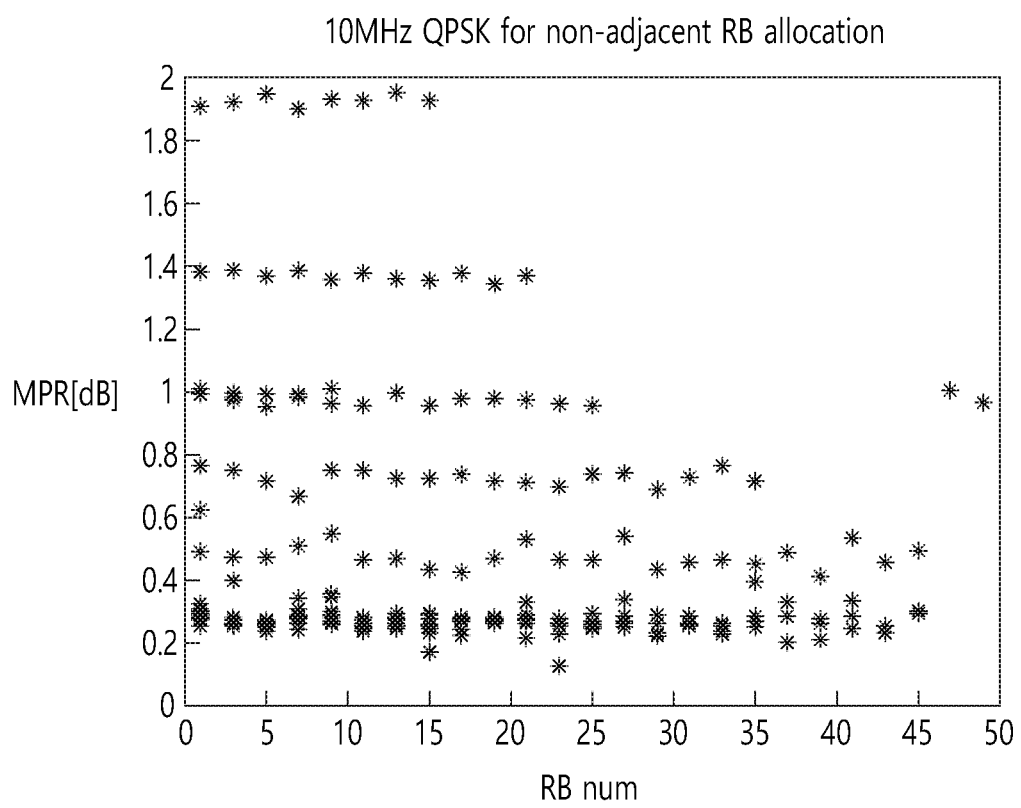
FIGS. 21a and 21b show the MPR simulation results according to a channel bandwidths of 10 MHz and modulation schemes for non-adjacent RB allocation with 3 dB power boosting.
Figure 21B:
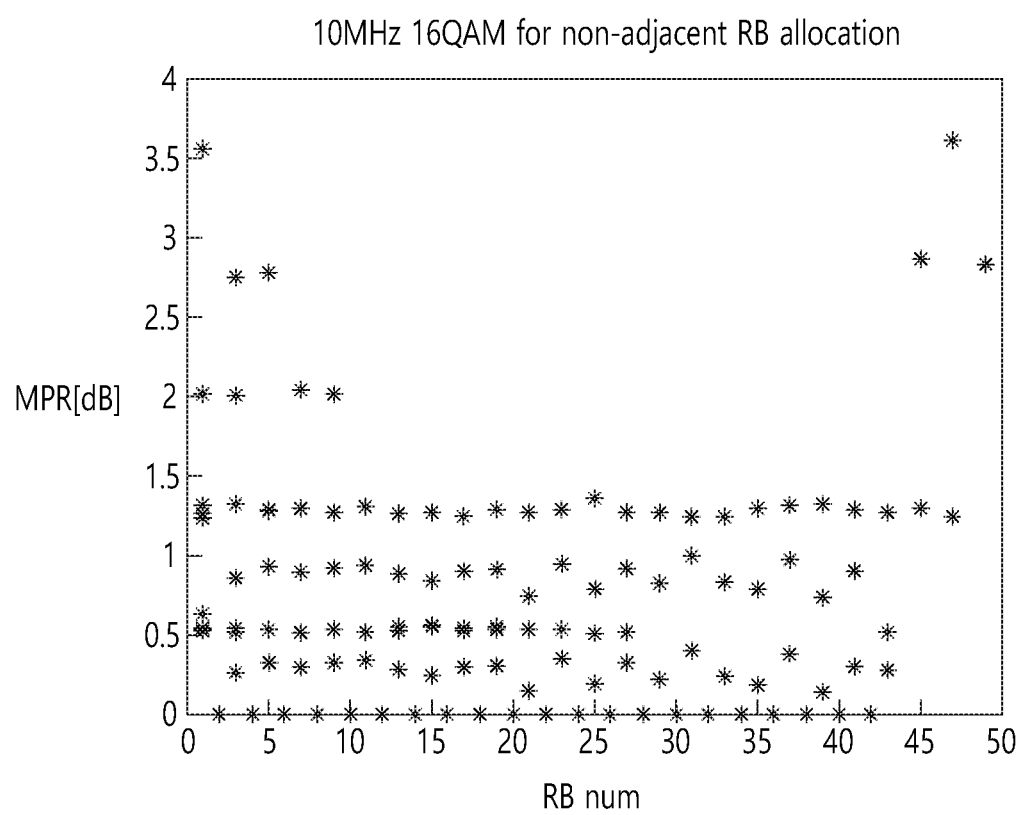

FIGS. 21a and 21b show the MPR simulation results according to a channel bandwidths of 10 MHz and modulation schemes for non-adjacent RB allocation with 3 dB power boosting.

In FIG. 21a, MPR simulation results for a channel bandwidth of 10 MHz and QPSK modulation are illustrated. Also, in FIG. 21b, MPR simulation results for a channel bandwidth of 10 MHz and 16-QAM modulation are illustrated FIGS. 22a and 22b show the MPR simulation results according to a channel bandwidths of 20 MHz and modulation schemes for non-adjacent RB allocation with 3 dB power boosting.

Figure 22A:
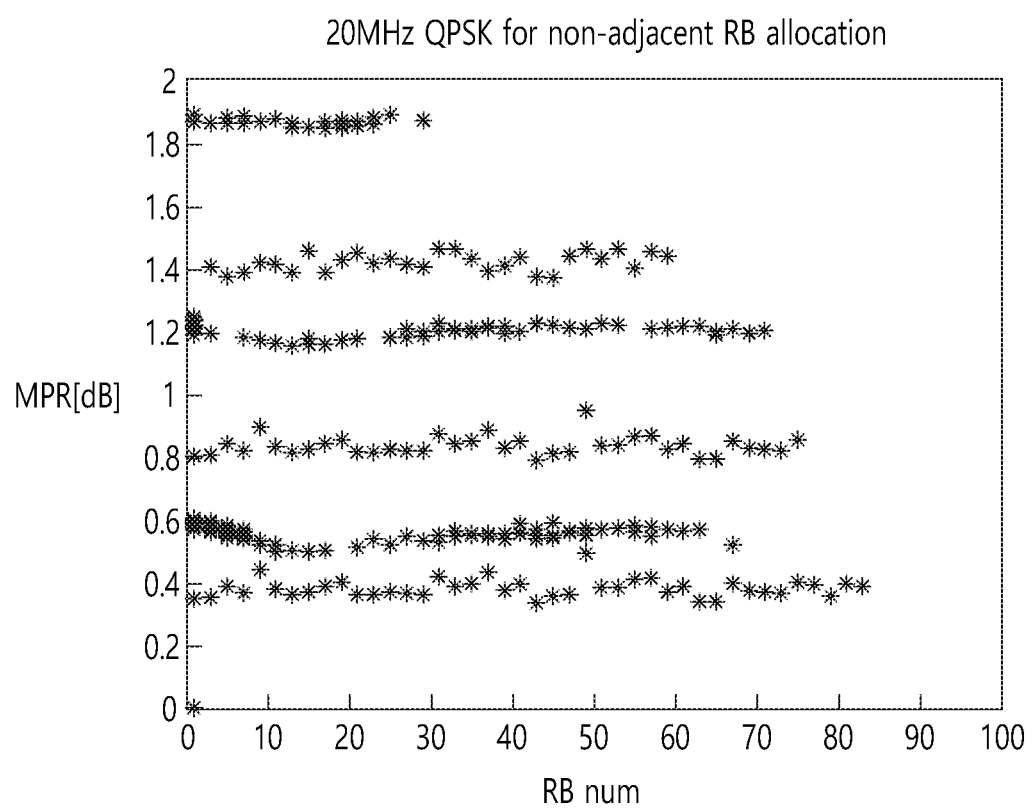
FIGS. 22a and 22b show the MPR simulation results according to a channel bandwidths of 20 MHz and modulation schemes for non-adjacent RB allocation with 3 dB power boosting.
Figure 22B:
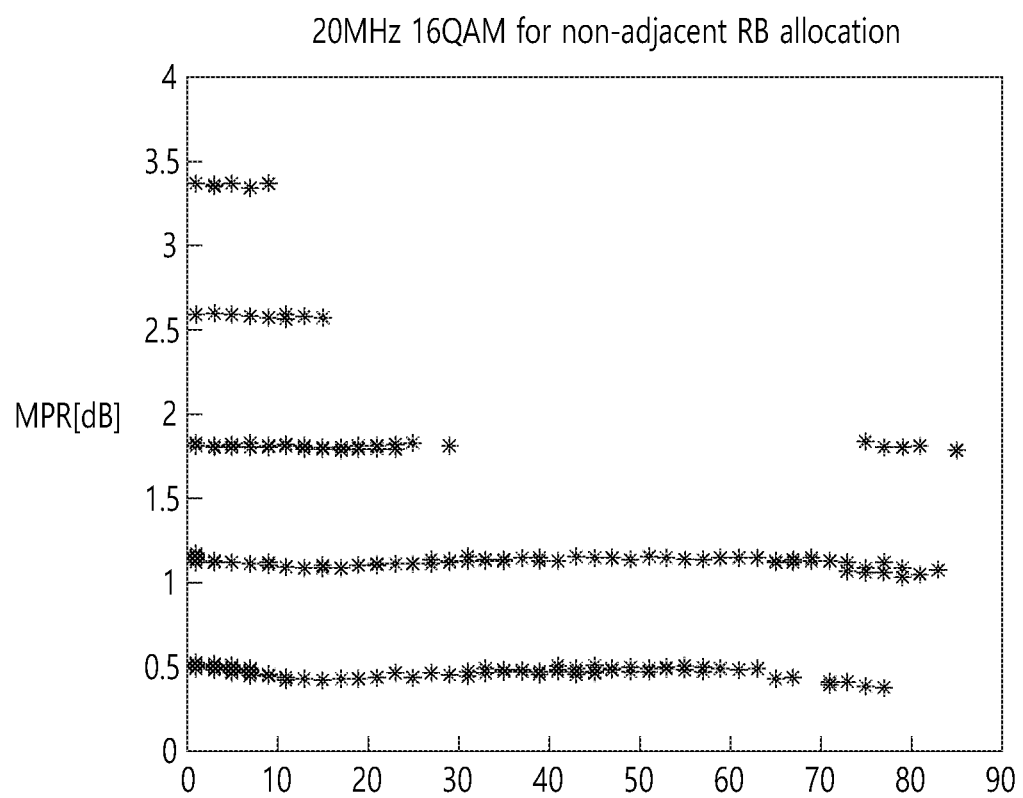

In FIG. 22a, MPR simulation results for a channel bandwidth of 20 MHz and QPSK modulation are illustrated. Also, in FIG. 22b, MPR simulation results for a channel bandwidth of 20 MHz and 16-QAM modulation are illustrated From the simulation results, the third approach proposes a below table to determine the MPR requirements for non-adjacent FDM transmissions with 3 dB power boosting.

TABLE 25

| Modulation | Channel bandwidth/Transmission bandwidth ($N_{RB}$) | | | | | | MPR (dB) |
|---|---|---|---|---|---|---|---|
| | 1.4 MHz | 3.0 MHz | 5 MHz | 10 MHz | 15 MHz | 20 MHz | |
| QPSK | | | | — | | — | ≤2 |
| 16 QAM | | | | — | | — | ≤4 |

The above table shows MPR for simultaneous PSCCH and PSSCH transmission with non-adjacent RB allocation.

III-3. Conclusion

The third approach proposes the MPR requirements according to the adjacent/non-adjacent RB allocation method, modulation schemes and channel bandwidths for power class 3 V2V UE. Based on these MPR simulation results, the required MPR levels for V2V UE with power class 3 may be decided.

The above described embodiments of the present invention may be implemented through various means. For example, the embodiments of the present invention may be implemented in hardware, firmware, software, and a combination thereof, which are described in detail with reference to the drawings.

Figure 23:
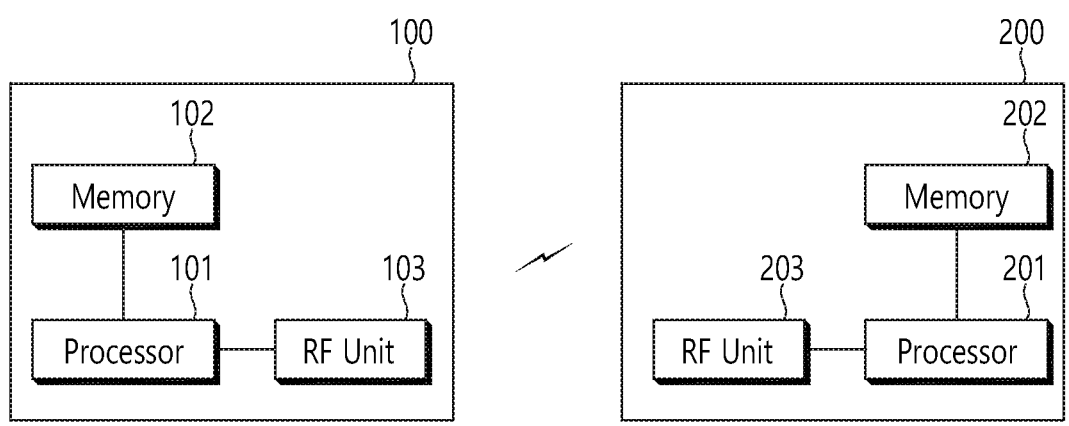
FIG. 23 is a block diagram of a wireless communication system in which the disclosure of the present specification is implemented.

FIG. 23 is a block diagram of a wireless communication system in which the disclosure of the present specification is implemented.

An eNB 200 includes a processor 201, a memory 202, and an RF unit 203. A memory 202 is connected to a processor 201 and saves various information for operating the processor 201. The RF unit 203 is connected to the processor 201 and transmits and/or receives a wireless signal. The processor 201 implements the suggested function, process, and/or method. In the above described embodiments, the operation of the eNB may be implemented by the processor 201.

A UE includes a processor, a memory 102, and an RF unit 103. The memory 102 is connected to the processor 101 and saves various information for operating the processor 101. The RF unit is connected to the processor 101 and transmits and/or receives a wireless signal. The processor 101 implements the suggested function, process, and/or method.

The processor may includes an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, etc.). The module is stored in the memory and may be executed by the processor. The memory may exit inside or outside the processor and may be connected to the processor in various known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for reducing transmission power, the method performed by a vehicle-to-everything (V2X) communication device and comprising:
    deriving a value of maximum power reduction (MPR);
    determining a transmission power by using the value of the MPR; and
    transmitting signals at the determined transmission power,
    wherein if the signals are a physical sidelink control channel (PSCCH) signal and physical sidelink shared channel (PSSCH) signal and if simultaneous transmissions of the PSCCH signal and the PSSCH signal is configured, the value of the the MPR is equal to or less than 1.5 dB or 2 dB.

2. The method of claim 1, wherein if the signals are modulated by a quadrature phase shift keying (QPSK), the value of the the MPR is equal to or less than 1.5 dB.

3. The method of claim 1, wherein if the signals are modulated by a 16 quadrature amplitude modulation (QAM), the value of the the MPR is equal to or less than 2 dB.

4. The method of claim 1, wherein the using of the value of the MPR includes:
    subtracting the value of the MPR from a maximum output power.

5. The method of claim 1, wherein if a resource blocks (RB) for the PSCCH and a RB for the PSSCCH are allocated in adjacent to each other, the value of the MPR is used to determine the transmission power.

6. A vehicle-to-everything (V2X) communication device for reducing transmission power, comprising:
    a transceiver; and
    a processor configured to control the transceiver and perform:
    deriving a value of maximum power reduction (MPR);
    determining a transmission power by using the value of the MPR; and
    transmitting signals at the determined transmission power,
    wherein if the signals are a physical sidelink control channel (PSCCH) signal and physical sidelink shared channel (PSSCH) signal and if simultaneous transmissions of the PSCCH signal and the PSSCH signal is configured, the value of the the MPR is equal to or less than 1.5 dB or 2 dB.

7. The V2X communication device of claim 6, wherein if the signals are modulated by a quadrature phase shift keying (QPSK), the value of the the MPR is equal to or less than 1.5 dB.

8. The V2X communication device of claim 6, wherein if the signals are modulated by a 16 quadrature amplitude modulation (QAM), the value of the the MPR is equal to or less than 2 dB.

9. The V2X communication device of claim 6, wherein the using of the value of the MPR includes:
    subtracting the value of the MPR from a maximum output power.

10. The V2X communication device of claim 6, wherein if a resource blocks (RB) for the PSCCH and a RB for the PSSCCH are allocated in adjacent to each other, the value of the MPR is used to determine the transmission power.

* * * * *